United States Patent
Redi et al.

(10) Patent No.: US 7,542,437 B1
(45) Date of Patent: Jun. 2, 2009

(54) SYSTEMS AND METHODS FOR CONSERVING ENERGY IN A COMMUNICATIONS NETWORK

(75) Inventors: Jason Keith Redi, Belmont, MA (US); William Dugald Watson, Jr., Pepperell, MA (US); Vladimir Alexandrov Shurbanov, Malden, MA (US)

(73) Assignee: BBN Technologies Corp., Cambridge, MA (US)

( * ) Notice: Subject to any disclaimer, the term of this patent is extended or adjusted under 35 U.S.C. 154(b) by 870 days.

(21) Appl. No.: 10/677,945

(22) Filed: Oct. 2, 2003

(51) Int. Cl.
*G08C 17/00* (2006.01)
*H04B 1/38* (2006.01)

(52) U.S. Cl. .................. 370/311; 455/574; 455/343.5

(58) Field of Classification Search ................ 370/328, 370/338, 311; 455/574, 343.2, 343.1, 572, 455/343.5; 340/435–436, 901–905
See application file for complete search history.

(56) References Cited

U.S. PATENT DOCUMENTS

| | | | |
|---|---|---|---|
| 4,964,121 A | | 10/1990 | Moore |
| 5,128,938 A | | 7/1992 | Borras |
| 5,203,020 A | | 4/1993 | Sato et al. |
| 5,301,225 A | * | 4/1994 | Suzuki et al. ............... 455/574 |
| 5,430,731 A | | 7/1995 | Umemoto et al. |
| 5,583,866 A | | 12/1996 | Vook et al. |
| 5,590,396 A | * | 12/1996 | Henry ...................... 455/426.1 |
| 5,710,975 A | * | 1/1998 | Bernhardt et al. .......... 340/7.22 |
| 5,790,946 A | | 8/1998 | Rotzoll |
| 6,052,779 A | | 4/2000 | Jackson et al. |
| 6,058,106 A | | 5/2000 | Cudak et al. |
| 6,104,708 A | | 8/2000 | Bergamo |
| 6,127,799 A | | 10/2000 | Krishnan |
| 6,192,230 B1 | | 2/2001 | van Bokhorst et al. |
| 6,208,247 B1 | | 3/2001 | Agre et al. |
| 6,243,579 B1 | * | 6/2001 | Kari ......................... 455/426.1 |
| 6,292,508 B1 | | 9/2001 | Hong et al. |
| 6,374,311 B1 | | 4/2002 | Mahany et al. |
| 6,381,467 B1 | | 4/2002 | Hill et al. |
| 6,414,955 B1 | | 7/2002 | Clare et al. |
| 6,463,307 B1 | * | 10/2002 | Larsson et al. .............. 455/574 |
| 6,473,607 B1 | | 10/2002 | Shohara et al. |
| 6,477,361 B1 | * | 11/2002 | LaGrotta et al. .......... 455/343.1 |
| 6,512,935 B1 | | 1/2003 | Redi |
| 6,564,074 B2 | * | 5/2003 | Romans ..................... 455/574 |

(Continued)

OTHER PUBLICATIONS

A. Salkintzis and C. Chamzas, "Performance Analysis of a Downlink MAC Protocol with Power-Saving Support," IEEE Trans. On Vehicular Tech., vol. 49, No. 3, pp. 1029-1040, May 2000.

(Continued)

*Primary Examiner*—Seema S Rao
*Assistant Examiner*—Mon Cheri S Davenport
(74) *Attorney, Agent, or Firm*—Ropes & Gray LLP

(57) ABSTRACT

A communications network (100) includes a first node (110) and a group of neighboring nodes (110). The first node (110) includes at least one transceiver (340). The first node (110) may observe one or more conditions in at least one of the communications network (100) and the first node (110) and select a sleep mode of a group of sleep modes based on the observed one or more conditions. Each sleep mode of the group of sleep modes may be associated with a different procedure. The first node (110) may power down the at least one transceiver (340) according to the procedure associated with the selected sleep mode.

26 Claims, 24 Drawing Sheets

U.S. PATENT DOCUMENTS

| | | | |
|---|---|---|---|
| 6,574,269 | B1 | 6/2003 | Bergamo |
| 6,583,675 | B2 | 6/2003 | Gomez |
| 6,590,889 | B1 | 7/2003 | Preuss et al. |
| 6,601,093 | B1 | 7/2003 | Peters |
| 6,694,149 | B1 | 2/2004 | Ady et al. |
| 6,714,983 | B1 | 3/2004 | Koenck et al. |
| 6,745,027 | B2 | 6/2004 | Twitchell, Jr. |
| 6,760,584 | B2 | 7/2004 | Jou |
| 6,791,949 | B1 | 9/2004 | Ryu et al. |
| 6,859,135 | B1 | 2/2005 | Elliott |
| 6,894,975 | B1 | 5/2005 | Partyka |
| 6,981,052 | B1 | 12/2005 | Cheriton |
| 7,020,501 | B1 | 3/2006 | Elliott et al. |
| 7,027,392 | B2 | 4/2006 | Holtzman et al. |
| 7,103,344 | B2 | 9/2006 | Menard |
| 7,110,783 | B2 | 9/2006 | Bahl et al. |
| 7,142,520 | B1 * | 11/2006 | Haverinen et al. .......... 370/311 |
| 7,155,263 | B1 | 12/2006 | Bergamo |
| 7,286,844 | B1 | 10/2007 | Redi et al. |
| 2002/0067736 | A1 | 6/2002 | Garcia-Luna-Aceves et al. |
| 2002/0071395 | A1* | 6/2002 | Redi et al. .................. 370/252 |
| 2002/0146985 | A1* | 10/2002 | Naden ......................... 455/70 |
| 2002/0147816 | A1 | 10/2002 | Hlasny |
| 2003/0066090 | A1 | 4/2003 | Traw et al. |
| 2003/0099210 | A1 | 5/2003 | O'Toole et al. |
| 2003/0114204 | A1 | 6/2003 | Allen et al. |
| 2003/0119568 | A1 | 6/2003 | Menard |
| 2003/0185170 | A1 | 10/2003 | Allen et al. |
| 2004/0077353 | A1 | 4/2004 | Mahany |
| 2004/0125773 | A1 | 7/2004 | Wilson et al. |
| 2004/0218580 | A1 | 11/2004 | Bahl et al. |
| 2004/0230638 | A1* | 11/2004 | Balachandran et al. ...... 709/200 |
| 2005/0009578 | A1* | 1/2005 | Liu ............................ 455/574 |
| 2005/0059347 | A1 | 3/2005 | Haartsen |
| 2005/0152329 | A1 | 7/2005 | Krishnan et al. |
| 2005/0185632 | A1 | 8/2005 | Draves, Jr. et al. |
| 2005/0207376 | A1 | 9/2005 | Ashwood-Smith et al. |
| 2005/0215280 | A1 | 9/2005 | Twitchell, Jr. |
| 2006/0007865 | A1 | 1/2006 | White et al. |
| 2006/0058102 | A1 | 3/2006 | Nguyen et al. |
| 2006/0068837 | A1 | 3/2006 | Malone |
| 2006/0107081 | A1 | 5/2006 | Krantz et al. |
| 2006/0135145 | A1 | 6/2006 | Redi |
| 2006/0229083 | A1 | 10/2006 | Redi |
| 2007/0070983 | A1 | 3/2007 | Redi et al. |
| 2007/0149204 | A1 | 6/2007 | Redi et al. |

OTHER PUBLICATIONS

I. Chlamtac, C. Petrioli, and J. Redi, "An energy-conserving access protocol for wireless communication," IEEE Int. Conf. On Comm. (ICC97), pp. 1059-1062, Montreal, Jun. 1997.
Rowson et al, "Everyday Problems and Always-On Radios," Berkeley Wireless Research Cetner, 11 pages.
Shah, "Energy Aware Routing for PicoRadio," Berkeley Wireless Research Cetner, 39 pages.
Swaneck, "Integrating Passive RF Technology with Crytographic Communications Protocols," Microchip Technology Inc., 2000, 7 pages.
Warneke et al, "Ultra-Low Power Communication Logic Circuits for Distributed Sensor Networks," UC Berkeley, 1998, 7 pages.
Warneke, "Ultra-Low Power Circuits for Distributed Sensor Networks (Smart Dust)," UC Berkeley, (Print Date: Jun. 15, 2003), p. 1-3.
Darabi et al, "An Ultra Low Power 900 MHz CMOS Receiver for Wireless Paging," University of California, Los Angeles, May 17, 1998, p. 1-33.
Van Dyck et al, "Distributed Sensor Processing Over an Ad Hoc Wireless Network: Simulation Framework and Performance Criteria," Wireless Communications Technologies Group, National Institute of Standards and Technology, Gaithersburg, Maryland; 5 pages.
Liu et al, "A Bluetooth Scatternet-Route Structure for Multihop Ad Hoc Networks," IEEE Journal on Selected Areas in Communications, 21:2(229-239), Feb. 2003.
Liu et al, "Simulation Modeling of Large-Scale Ad-hoc Sensor Networks," European Simulation Interoperability Workshop, Univ. of Westminster, London; Jun. 25-27, 12 pages.
Clare et al, "Self-Organizing Distributed Sensor Networks," Rockwell Science Center, Eelectrical Engineering Department, Univ. of California Los Angeles; 9 pages.
Doherty, Lance, "Algorithms for Position and Data Recovery in Wireless Sensor Networks," Department of Electrical Engineering and Computer Sciences, Univ. of California at Berkeley; 54 pages.
Sciences, Univ. of California at Berkeley; 54 pages.
U.S. Appl. No. 11/895,608, Niky Riga.
U.S. Appl. No. 11/895,527, Basu et al.
U.S. Appl. No. 10/786,288, Brig Barnum Elliott.
Hong et al, "Scalable Routing Protocols for Mobile Ad Hoc Networks," IEEE Network; Jul./Aug. 20002; pp. 11-21.
Lang, "A Comprehensive Overview about Selected Ad Hoc Networking Routing Protocols," Mar. 14, 2003.
Halvardsson et al, "Reliable Group Communication in a Military Mobile Ad Hoc Network," Vaxjo University School of Mathematics and Systems Engineering, Report # 04006, Feb. 2004, pp. 1-52.
Wieselthier et al. "On the Construction of Energy-Efficient Broadcast and Multicast Tress in Wireless Networks," Infocom 2000, 2000, p. 585-594.
Ruppe et al, "Near Term Digital Radio (NTDR) System," IE, 1997, pp. 1282-1287.
Ogier et al, "Topology Dissemination Based on Reverse-Path Forwarding (TBRPF)," Sunsite.dk, Technical Memo, RFC 3684, The Internet Society (2004), Feb. 2004, pp. 1-49.
Clausen, et al, "Optimized Link State Routing Protocol (OLSR)," Technical Memo, RFC 3626, The Internet Society (2003), Oct. 2003, pp. 1-6.
Office Action dated Sep. 8, 2006, U.S. Appl. No. 10/786,288.
Office Action dated Mar. 30, 2007, U.S. Appl. No. 10/786,288.
Office Action dated Sep. 25, 2007, U.S. Appl. No. 10/786,288.
Office Action dated May 7, 2007, U.S. Appl. No. 11/078,257.
Ebner et al, "Synchronization in Ad Hoc Networks Based on UTRA TDD" (2003).
Tjoa R et al: "Clock drift reduction for relative time slot TDMA-based sensor networks" Sep. 5, 2004) PIMRC 2004, IEEE, pp. 1042-1047.
Dai H et al: "Tsync: A Lightweight Bidirectional Time Synchronization Service for Wireless Sensor Networks" (Jan. 2004), Mobile Computing and Communications Review, ACM, NY, pp. 125-139, ISSN: 1091-1669.
Ebner A et al: "Decentralized slot synchronization in highly dynamic ad hoc networks" Wireless Personal Mutlimedia Communications, 2002, IEEE, vol. 2, (Oct. 27, 2002).
Zhijun Shang et al: "A low overhead multi-hop time sync protocol for wireless sensor networks" Networking, Sensing and Control, 2005, IEEE (Mar. 19, 2005), pp. 54-59.
Singh S et al "Power-Aware Routing in Mobile Ad Hoc Networks" Mobicom '98, Proceedings of the 4th Annual ACM/IEEE International Conference on Mobile Computing and Networking, Dallas, TX (Oct. 25-30, 1998) XP000850267, pp. 181-190.
Fan Ye et al "A randomized energy-conservation protocol for resilient sensor networks" Wireless Networks; The Journal of Mobile Communication, Computation and Information, Kluwer Academic Publishers, Do, vol. 12, No. 5, (Apr. 27, 2006) pp. 637-652.
Office Action dated Apr. 3, 2008, U.S. Appl. No. 10/786,288.
Office Action dated Dec. 10. 2008, U.S. Appl. No. 11/439,320.
Office Action dated Dec. 9, 2008, U.S. Appl. No. 11/347,963.

* cited by examiner

SYSTEMS AND METHODS FOR CONSERVING ENERGY IN A COMMUNICATIONS NETWORK

GOVERNMENT CONTRACT

The U.S. Government has a paid up license in this invention and the right in limited circumstances to require the patent owner to license others on reasonable terms as provided for by the terms of Contract No. N66001-99-C-8512 awarded by the Defense Advanced Research Projects Agency (DARPA).

FIELD OF THE INVENTION

The present invention relates generally to communications networks and, more particularly, to systems and methods for conserving energy in communications networks.

BACKGROUND OF THE INVENTION

Wireless mobile networks are useful in many situations where network infrastructure either does not exist or cannot be trusted. Examples include military operations, disaster relief, and temporary offices. A packet radio network (or ad hoc network) is a type of wireless mobile network that typically uses radio frequency (RF) transceivers to send and receive data.

Radio transceivers are major energy consumers in wireless mobile network systems. This is mainly due to the fact that the radio transceivers are typically powered on at all times and are constantly consuming energy, even when data is not being transmitted or received. A Fundamental advancements to increase battery capacity and/or reduce transceiver power requirements are not expected in the near future. Therefore, energy-conserving techniques are the main avenue for extending system life.

Most conventional energy-conservation techniques for wireless mobile networks predominantly focus on minimizing the transmit power and performing certain routing operations and not on simply powering up or down the radio transceivers, which, as set forth above, are the major energy consumers. The current techniques that specifically address radio transceiver energy consumption are designed for centralized base station based networks (usually employing time division multiple access (TDMA)) where communication is scheduled and inactivity periods are predetermined, allowing nodes to switch off their transceivers and conserve energy. These techniques cannot be employed in decentralized, wireless mobile networks, however, because communication is unscheduled and turning off the transceiver may result in an unacceptable number of packets being lost.

Therefore, there exists a need for systems and methods for conserving energy in decentralized, wireless mobile networks.

SUMMARY OF THE INVENTION

Systems and methods consistent with the principles of the invention provide improved techniques for conserving energy in a communications network.

In accordance with an exemplary implementation consistent with the principles of the invention, a communications network includes a first node and a group of neighboring nodes. The first node includes at least one transceiver. The first node may observe one or more conditions in at least one of the communications network and the first node and select a sleep mode of a group of sleep modes based on the observed one or more conditions. Each sleep mode of the group of sleep modes is associated with a different procedure. The first node may power down the at least one transceiver according to the procedure associated with the selected sleep mode.

In another implementation consistent with the principles of the invention, a method for conserving power in a communications node that includes at least one transceiver is provided. The method may include selecting a sleep mode from a group that includes at least four sleep modes. A first sleep mode of the group includes powering down the at least one transceiver without notifying neighboring nodes. A second sleep mode of the group includes powering down the at least one transceiver after transmitting a link level broadcast to neighboring nodes. A third sleep mode of the group includes powering down the at least one transceiver after transmitting a point-to-point message to each neighboring node and receiving a first acknowledgement message from each neighboring node. A fourth sleep mode of the group includes powering down the at least one transceiver after transmitting a routing application message to each neighboring node that causes each neighboring node to remove the communications node from its routing tables and receiving a second acknowledgement message from each neighboring node. The method may also include powering down the at least one transceiver in accordance with the selected sleep mode.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention provide a suite of four energy-conserving reception protocols, named nano-sleep, micro-sleep, mecro-sleep, and macro-sleep. For each protocol, the node autonomously decides whether and when to power down its transceiver(s) based on its own observations of traffic conditions and, in some cases, of its neighbors' states.

Exemplary Network

Figure 1:
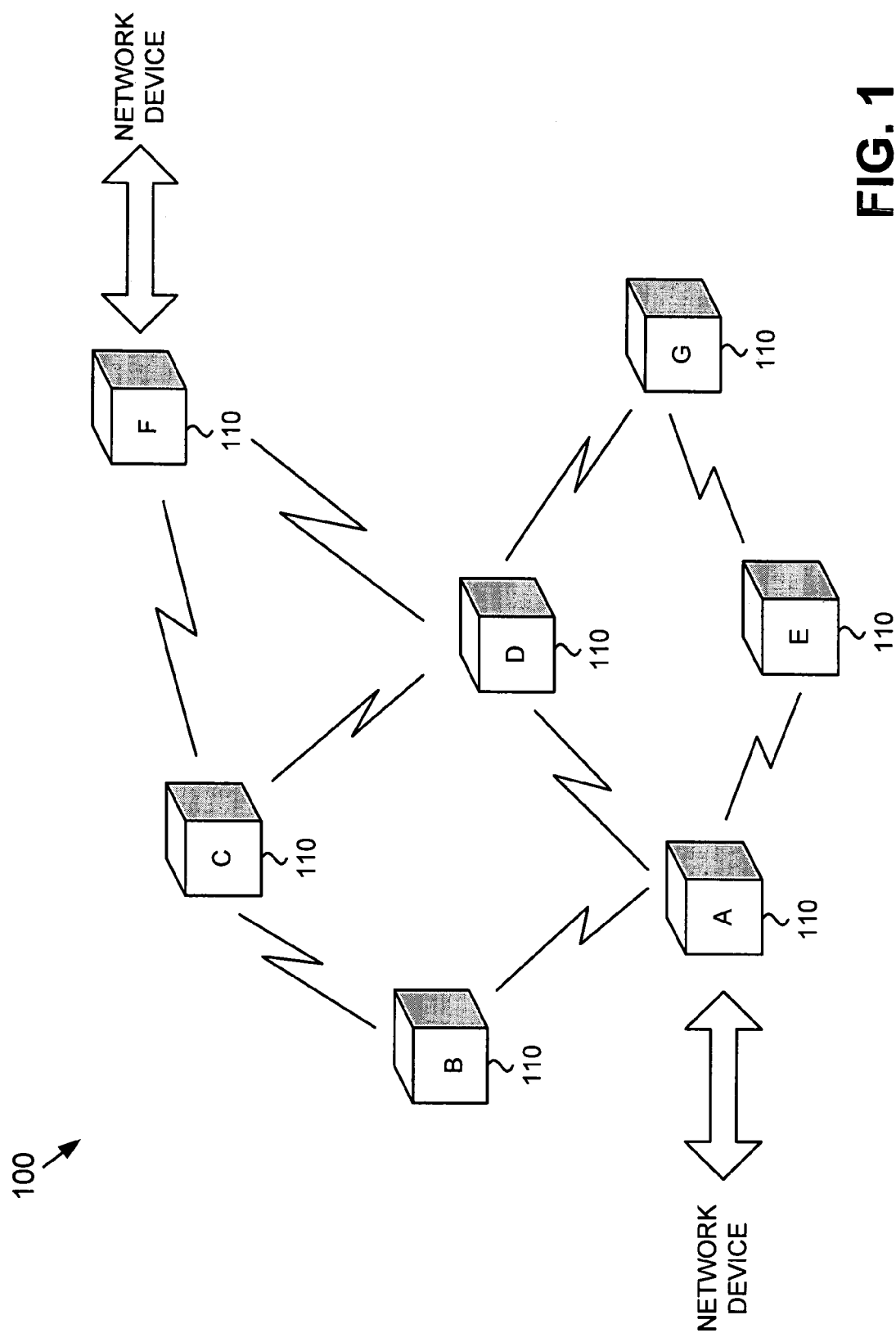
FIG. 1 illustrates an exemplary network in which systems and methods consistent with the principles of the invention may be implemented.

FIG. 1 illustrates an exemplary network 100 in which systems and methods consistent with the principles of the invention may be implemented. Network 100 may include mobile nodes 110 that may route data between network devices or networks. Seven nodes 110 have been shown for simplicity. A typical network may include more or fewer nodes than illustrated in FIG. 1.

The network devices may include devices, such as mainframes, minicomputers, personal computers, laptops, personal digital assistants, or the like, capable of transmitting data via nodes 110. Network devices may also include routing and/or switching devices. Network devices may connect to nodes 110, such as nodes A and F 110, via wired, wireless, and/or optical connections.

Nodes 110 may include one or more devices for receiving and transmitting data in network 100. A node 110 may, for example, transmit data to other nodes in the form of packets or other types of data units, such as cells. Each node 110 may also include logic that enables nodes 110 to find each other, determine paths through network 100 for data traffic from source to destination(s), and detect and repair ruptures in network 100 as nodes 110 move, as nodes 110 fail, as battery power changes, as communication path characteristics change, etc.

Figure 2:
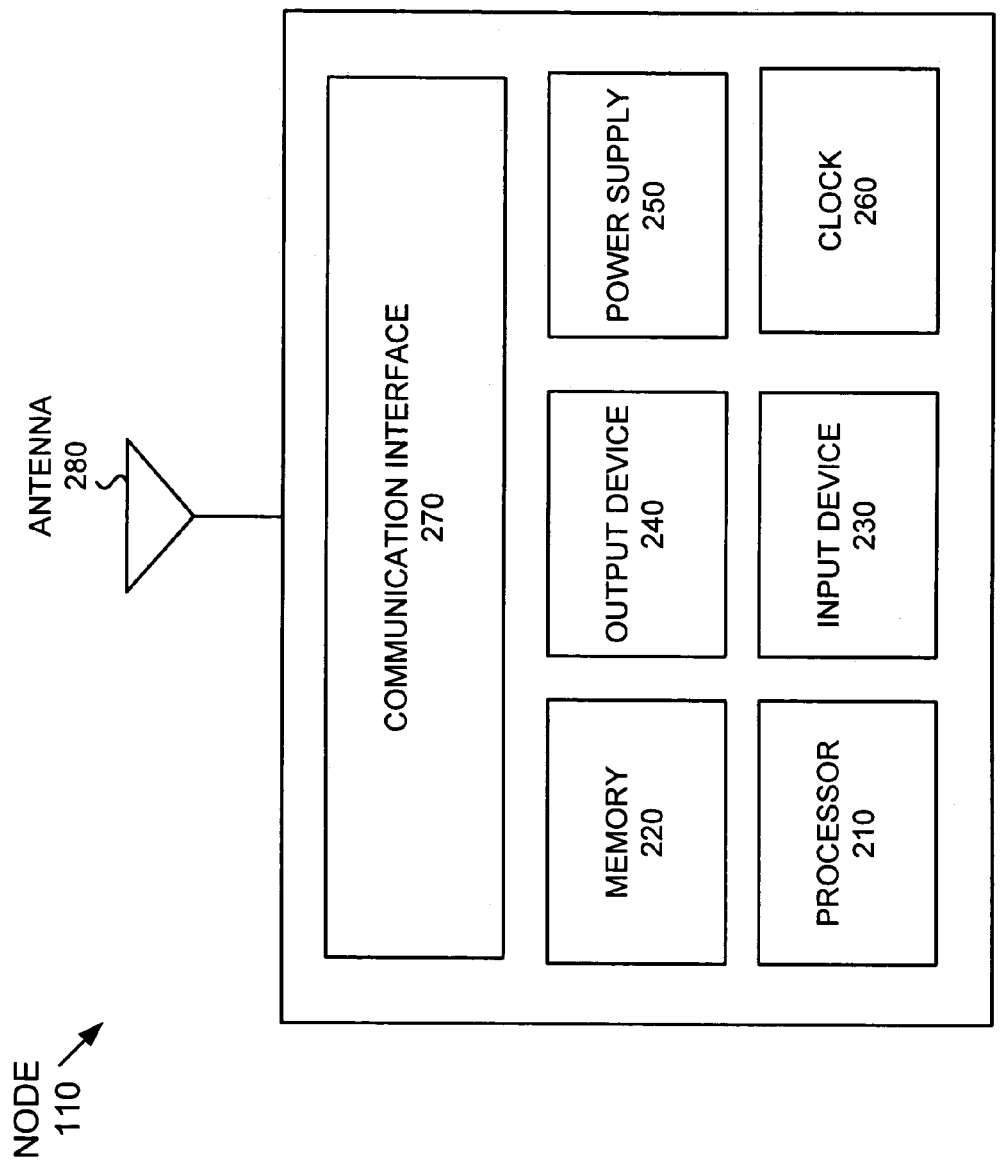
FIG. 2 illustrates an exemplary configuration of a node of FIG. 1 according to one implementation consistent with the principles of the invention.

FIG. 2 illustrates an exemplary configuration of a node 110 according to one implementation consistent with the principles of the invention. The configuration illustrated in FIG. 2 is provided for explanatory purposes only. Other configurations are possible. Moreover, node 110 may include other components than those illustrated in FIG. 2 that aid in receiving, processing, and/or transmitting data.

As illustrated, node 110 may include a processor 210, a memory 220, an input device 230, an output device 240, a power supply 250, a clock 260, a communication interface 270, and an antenna 280. Processor 210 may include any type of conventional processor or microprocessor that interprets and executes instructions. Memory 220 may include a conventional random access memory (RAM) device or another type of dynamic storage device that stores information and instructions for execution by processor 210, a read only memory (ROM) device or another type of static storage device that stores static information and instructions for use by processor 210, and/or some type of magnetic or optical recording medium and its corresponding drive. Instructions used by processor 210 may also, or alternatively, be stored in another type of computer-readable medium. A computer-readable medium may include one or more memory devices and/or carrier waves.

Input device 230 may include one or more conventional mechanisms that permit an operator to input information to node 110, such as a keyboard, a mouse, a pen, one or more biometric mechanisms, and the like. Output device 240 may include one or more conventional mechanisms that output information to the operator, including a display, a printer, a speaker, etc. Power supply 250 may include a battery, or the like, for providing power to the components of node 110. Clock 260 may include one or more conventional counters (also referred to as "timers") that are capable of counting for predetermined period(s) of time. As will be described in further detail below, clock 260 may, in one implementation consistent with the principles of the invention, include a timer for regulating the amount of time that a particular node 110 may remain in a sleep mode. Clock 260 may also include a timer for tracking the amount of time since a node 110 has entered a sleep mode.

Communication interface 270 may include one or more transceiver-like mechanisms that enable node 110 to communicate with other devices and/or systems, such as other nodes 110 in network 100 via antenna 280. In one implementation consistent with the principles of the invention, communication interface 270 includes one or more radio transceivers. Antenna 280 may include one or more directional antennas and/or omni directional antennas.

The software instructions contained in memory 220 may cause processor 210 to perform the functions described below. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3:
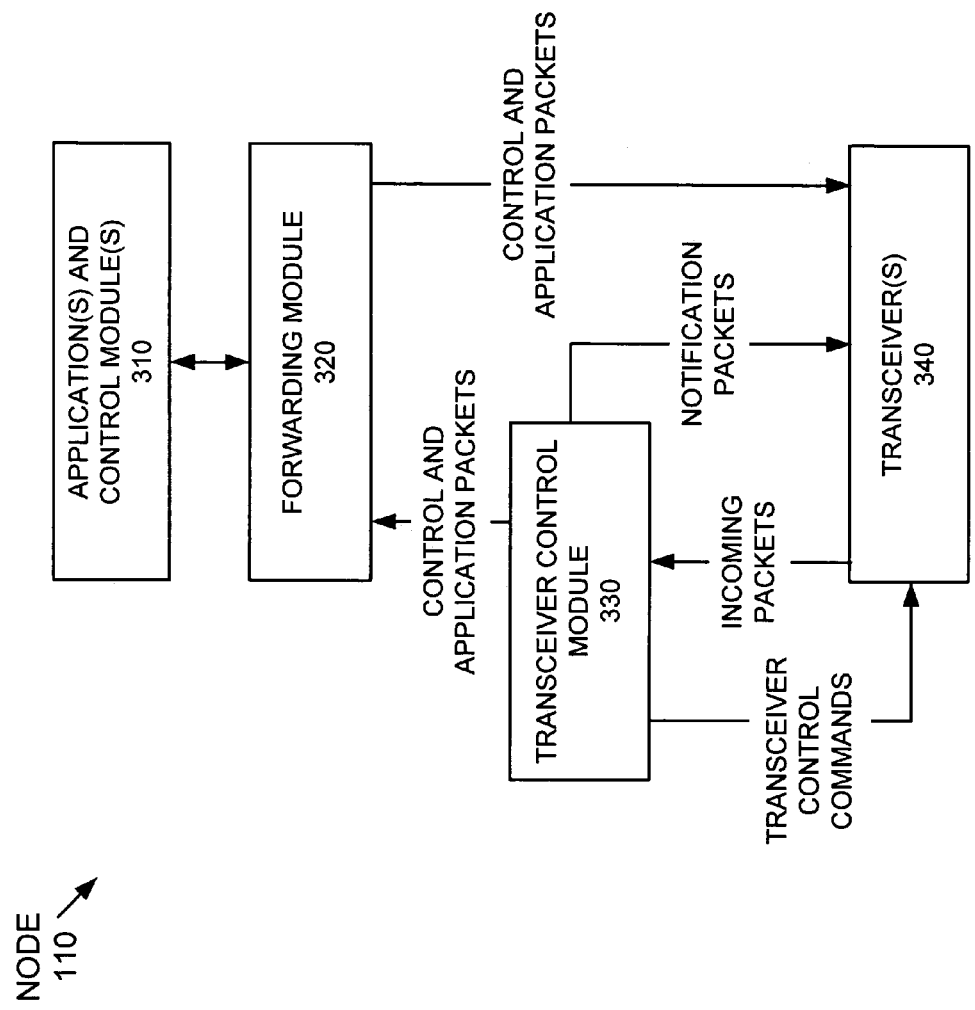
FIG. 3 illustrates an exemplary functional block diagram of the node of FIG. 2 in an implementation consistent with the principles of the invention.

FIG. 3 illustrates an exemplary functional block diagram of node 110 of FIG. 2 in an implementation consistent with the principles of the invention. Node 110 may include a group of applications and control modules 310, a forwarding module 320, a transceiver control module 330, and a group of radio transceivers 340. Applications 310 may include a group of network applications that generates packets (or other data units) to be transmitted to network 100 and/or processes packets received from network 100. Applications 310 allow users to interact with network 100. Applications 310 may include telnet, file transfer protocol (ftp), e-mail, Internet Relay Chat (IRC), etc.

Control modules 310 may include one or more modules that aid in routing data through network 100. In one implementation, control modules 310 may include a routing module and a neighbor discovery module. The routing module may manage one or more tables that are compatible with forwarding module 320. Forwarding module 320 may use multiple tables acquired from the routing module to ultimately generate routing information, control information for transceivers 340, and an indication of a correct queuing discipline to use with the packet. Typically, a type of service (TOS) indicator is assigned to a packet by an application to specify particular service parameters. The service parameters may include transmission power requirements, priority indicators (e.g., "urgent" or "low delay"), error ratios, resilience, transit delay, and so forth.

The neighbor discovery module may store location information for node 110 and any neighboring nodes 110 in network 100. For example, the neighbor discovery module for node A 110 (FIG. 1) may store location information for neighboring (or next hop) nodes B, D, and E 110. The neighbor discovery module may transfer next hop location data to forwarding module 320. Forwarding module 320 may place node 110's location information into messages that are to be broadcast, for example, via antenna 280 to neighboring nodes 110.

Control modules 310 may also include a location determining component, such a global positioning satellite (GPS) driver that receives position and orientation data and determines latitude, longitude, and an orientation that corresponds to the position and orientation data. The GPS driver may further, based on historical position and orientation data; determine a current heading of node 110. Control modules 310 may further include a link characterization component that determines link quality and power control information related to transmitting and receiving packets to and from neighboring nodes 110 of network 100.

Forwarding module 320 may consult routing tables provided by control modules 310 to construct and forward packets to appropriate destinations via neighboring nodes 110 of network 100. Forwarding module 320 may include a group of queues (not shown) that temporarily store packets prior to forwarding to transceivers 340. The packets may include control packets and/or application packets that were received from applications and control modules 310 or a neighboring node 110 via transceiver control module 330.

Transceiver control module 330 controls the operation of transceivers 340 via the transmission of transceiver control commands. In one implementation consistent with the principles of the invention, transceiver control module 330 determines the sleep mode in which transceivers 340 are placed and causes transceivers 340 to enter the determined sleep mode and wake up from the determined sleep mode via the transmission of one or more control commands. Transceiver control module 330 also receives incoming packets from transceivers 340 and forwards the packets to forwarding module 320. As will be described in greater detail below, transceiver control module 330 may generate and forward neighbor notification packets (e.g., in the form of broadcast messages, point-to-point messages, and routing application messages) to transceivers 340 for transmission to neighboring nodes 110. These notification packets may notify neighboring nodes 110 that the current node is entering a sleep mode.

Each transceiver 340 may cause packets (or other data units) to be transmitted to or received from a neighboring node 110 via one or more antennas, such as antenna 280 (FIG. 2). As described above, the antennas may include, for example, one or more directional antennas and/or omni-directional antennas.

Exemplary Processing

Implementations consistent with the principles of the invention provide a suite of four energy-conserving reception protocols, named, for example, nano-sleep, micro-sleep, mecro-sleep, and macro-sleep. For each protocol, the node autonomously decides whether and when to power down its transceiver(s) based on its own observations of traffic conditions and, in some cases, of its neighbors' states.

Figure 4:
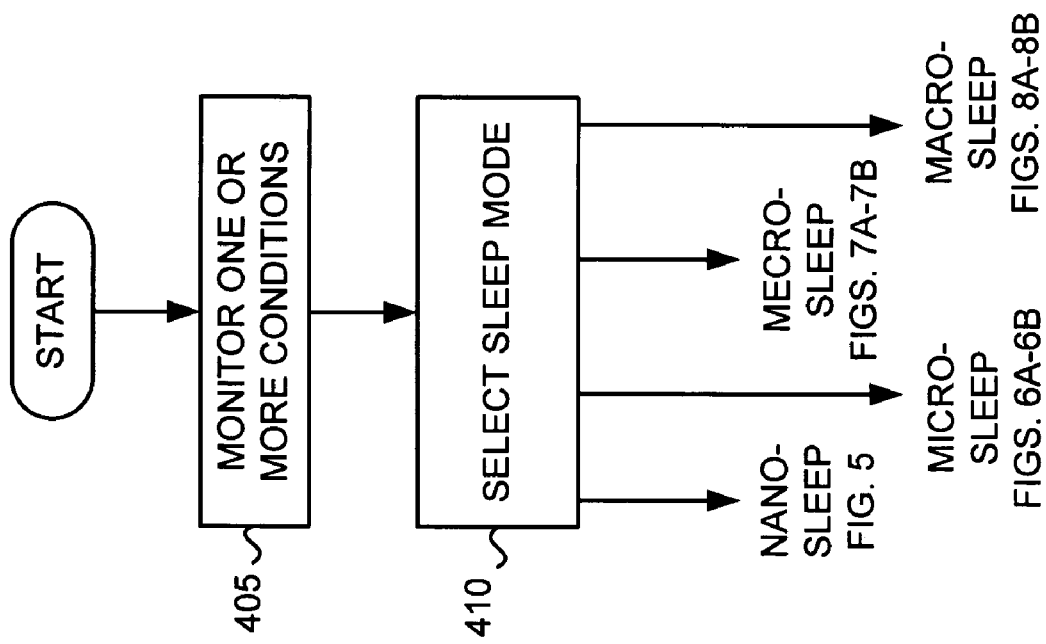
FIGS. 4-8B illustrate an exemplary process for conserving energy in a node in an implementation consistent with the principles of the invention.

FIG. 4 illustrates an exemplary process for conserving energy in a node, such as node 110, in an implementation consistent with the principles of the invention. Processing may begin with node 110 monitoring one or more conditions associated with network 100 and/or with node 110 itself (act 405). In one implementation, node 110 may, for example, monitor the volume of traffic in network 100. Node 110 may also monitor the amount of power remaining in power supply 250 and the amount of time since node 110 has last entered a sleep mode. It will be appreciated that node 110 may monitor other conditions for determining whether to enter into a sleep mode.

Node 110 may select a sleep mode based on the monitored one or more conditions (act 410). Node 110 may, at predetermined time intervals, compare the observed conditions with a set of parameters to determine whether to enter into a sleep mode. In one implementation, the parameters may include, for example, a shutdown throughput bound (STHB) parameter, a shutdown energy bound (SEB) parameter, and a shutdown timer bound (STMB) parameter. The STHB parameter represents a traffic volume threshold. In one implementation consistent with the principles of the invention, node 110 may enter a sleep mode only if the traffic volume observed in network 100 is less than the STHB parameter. The SEB parameter represents a power level threshold in node 110. In one implementation consistent with the principles of the invention, node 110 may enter a sleep mode if node 110's power supply 250 has less than SEB remaining energy. The STMB parameter represents the minimum period between consecutive shutdowns. If the STMB parameter has not been reached, node 110 may not enter a sleep mode. It will be appreciated that node 110 may consider other parameters when deciding to enter a sleep mode and which sleep mode to enter. For example, node 110 may base its sleep mode decision on a shutdown probability (SP) parameter. The SP parameter represents the probability of entering a sleep mode, assuming the above-described parameters are satisfied.

In an exemplary implementation, node 110 may select from among the following sleep modes: nano-sleep, micro-sleep, mecro-sleep, and macro-sleep. In the nano-sleep mode, node 110 may base its shut down decision solely on its own observations. Node 110 does not consider the state of other network members or inform them of its decision. Thus, the nano-sleep mode incurs no communication overhead. Since other nodes are not informed that node 110 has gone to sleep, these other nodes may attempt to send packets to the sleeping node and eventually may drop such packets, if they exceeded the maximum retransmission attempts. Consequently, the time period in which node 110 remains in the nano-sleep mode should be selected so as to prevent significant packet loss, or to keep retransmit attempts at neighboring nodes to a minimum (since each retransmission usually costs energy at those neighbors).

Micro-sleep features the added complexity and overhead of link-level notification sent by node 110 to inform its neighbors that node 110 is shutting down. Such notification can significantly reduce the retransmission and dropping of packets, and allow longer power-down periods with minimal consequence. The neighboring nodes may buffer any packets that they receive that are destined for node 110 until node 110 awakes. As described below, the notification packet sent by node 110 includes the length of time for which node 110 will sleep. The neighboring nodes that do not receive the link-level broadcast (e.g., due to collisions, etc.) will not know that node 110 has entered a sleep mode and will not buffer packets for node 110, so some packets may be lost. Since the broadcast may be unreliable, node 110 will not remain in the micro-sleep mode for such a long period of time that it becomes important that each neighboring node receives the broadcast.

The unreliability of the micro-sleep notification and the size of the neighbor nodes' buffers limit the length of time node 110 can go to sleep without significantly affecting network 100's performance. Mecro-sleep adds reliable application-level notification to support prolonged sleep periods. Before node 110 enters mecro-sleep, node 110 may perform a reliable point-to-point broadcast to all its neighbors. As in micro-sleep, the notification packet includes the amount of time for which node 110 will sleep. The neighboring nodes may buffer any packets they receive that are destined for node 110 until node 110 awakes.

For situations where node 110 shuts off for significant periods of time (e.g., hours or days), it may be necessary to deliberately separate node 110 from the rest of network 100. This is particularly important for link-state routing protocols, since each neighbor node that detects a lost connection due to a sleeping node as a result of its prolonged absence floods a link-state announcement (LSA) throughout the network, causing a large amount of network-wide control traffic. Therefore, in the macro-sleep mode, node 110 may reliably flood an explicit routing application message indicating its entry into long-term sleep. Upon reception of such a message, neighboring nodes may remove the entry for node 110 from various protocol modules, including forwarding and routing tables, until the time in which node 110 wakes from the sleeping state. When the node is expected to awaken, the sleeping node 110 and its links automatically reappear in the routing and forwarding modules of all the other nodes in the network.

As will be described in greater detail below, node 110 may select a particular sleep mode by considering the tradeoff between the number of packets that may be dropped during the period in which the node is asleep and the amount of power that node 110 wants to save. For example, node 110 may analyze the type of traffic that is passing through network 100 and may determine that dropping 5% of the packets in this type of traffic may be acceptable. Node 110 may then sleep for an amount of time that would result in approximately 5% of packets being dropped. As another example, node 110 may monitor the amount of traffic in network 100. If the amount of traffic passing through node 110 is small, then node 110 may go to sleep for a longer period of time (e.g., node 110 may select the mecro-sleep or macro-sleep mode) because node 110 is not as important in network 100.

Figure 5:
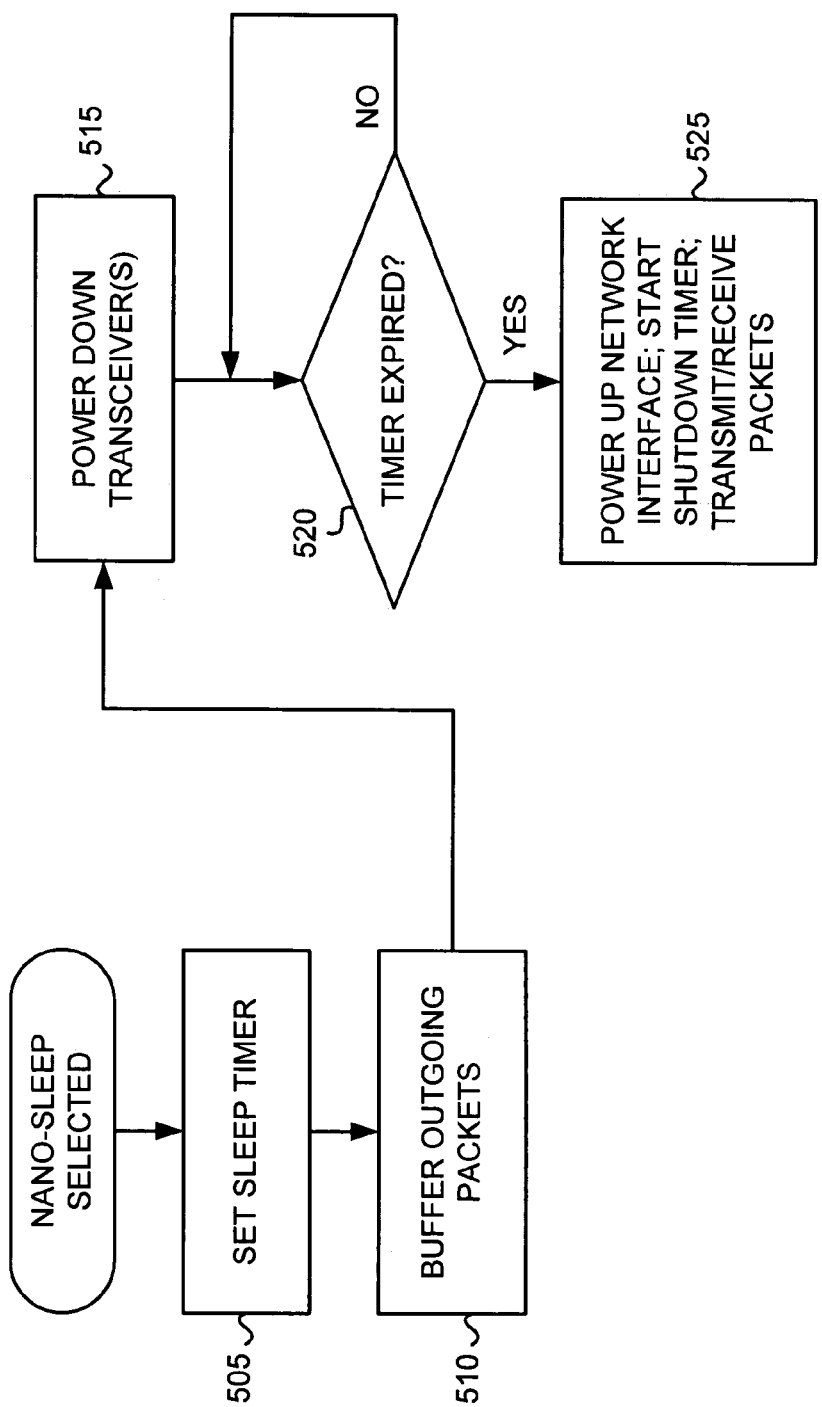

Assume that node 110 selects the nano-sleep mode in act 410. FIG. 5 illustrates an exemplary process for conserving energy in the nano-sleep mode in an implementation consistent with the principles of the invention. To enter nano-sleep, node 110 may set a timer, such as clock 260 (FIG. 2), to the amount of time that node 110 will remain in the nano-sleep mode (act 505). In one implementation consistent with the principles of the invention, node 110 may set timer/clock 260 to a time period on the order of milliseconds. Node 110 may then buffer all outgoing packets (act 510) and power down its transceiver(s) 340 (FIG. 3) (act 515). Node 110 may wait until timer 260 has expired (act 520). Once expired, node 110 may power up transceiver(s) 340, start a timer to track the amount of time between shutdowns, and begin transmitting and receiving packets via transceiver(s) 340 (act 525).

Figure 6A:
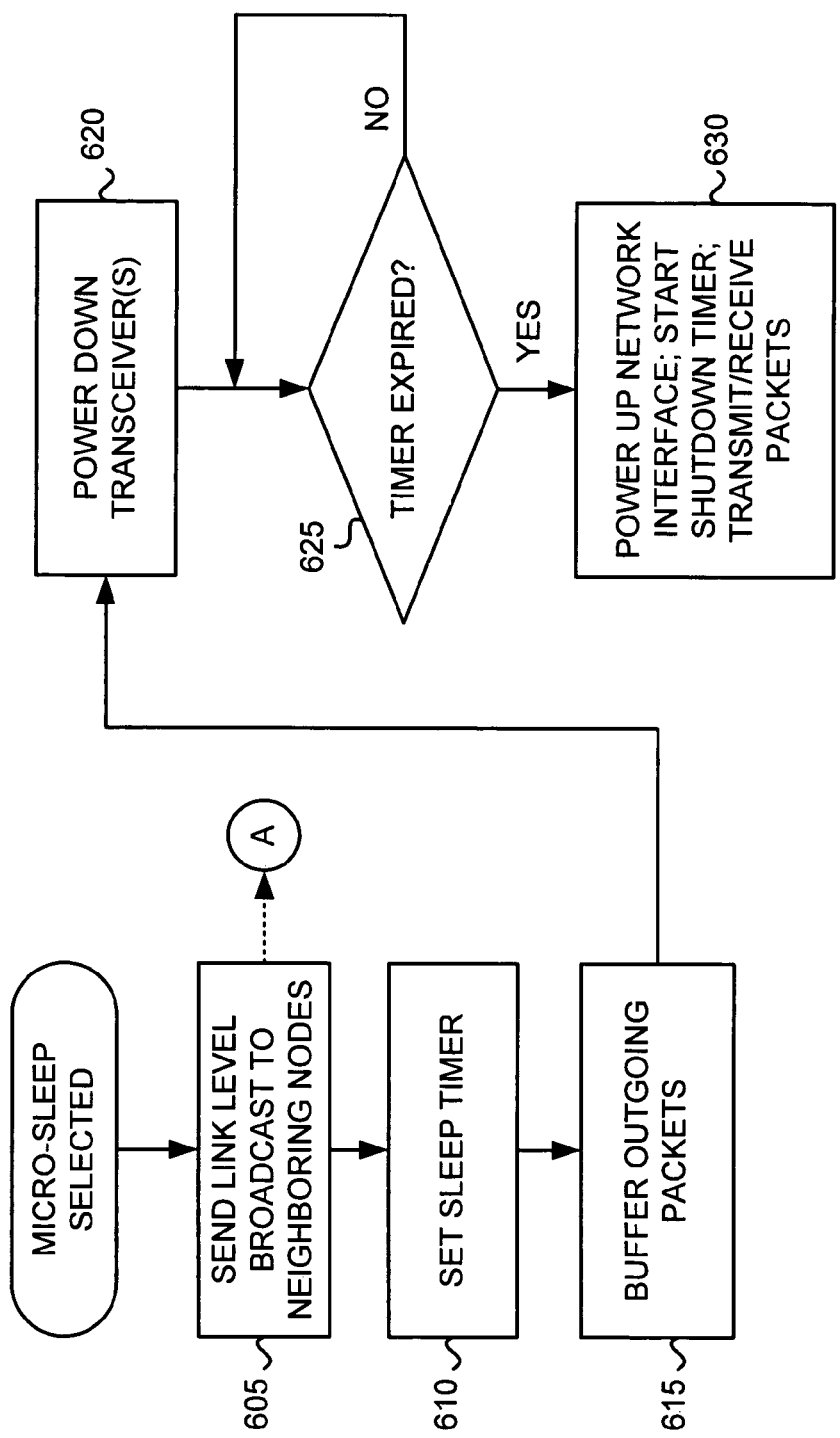

Assume that node 110 selects the micro-sleep mode in act 410. FIG. 6A illustrates an exemplary process for conserving energy in the micro-sleep mode in an implementation consistent with the principles of the invention. Upon selection of the micro-sleep mode, node 110 may transmit a link-level broadcast message to each of node 110's neighbors (act 605, FIG. 6A). For example, assuming node A in FIG. 1 is the node entering into micro-sleep, node A may send a link-level broadcast to its neighbors, namely nodes B, D, and E. In one implementation consistent with the principles of the invention, the link-level broadcast message may include the link-layer address of node 110 and its sleep duration T. Node 110 may then set a timer, such as clock 260 (FIG. 2), to the amount of time T that node 110 will remain in the micro-sleep mode (act 610). In one implementation consistent with the principles of the invention, the time period T may be on the order of seconds. Node 110 may then buffer all outgoing packets (act 615) and power down transceiver(s) 340 (act 620). Node 110 may wait until timer 260 has expired (act 625). Once expired, node 110 may power up transceiver(s) 340, start a timer to track the amount of time between shutdowns, and begin transmitting and receiving packets via transceiver(s) 340 (act 630).

Figure 6B:
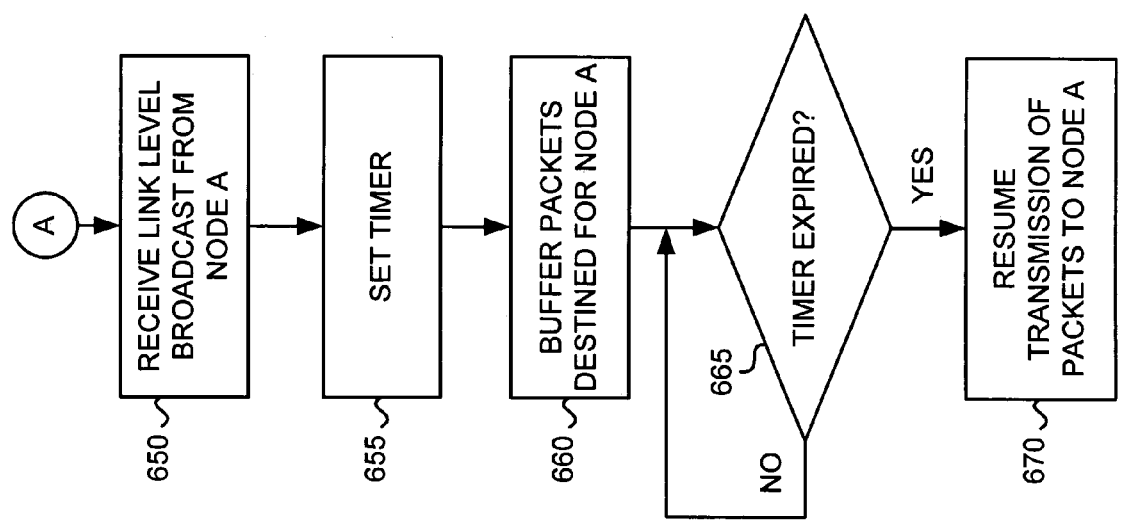

FIG. 6B illustrates an exemplary process, performed by a neighboring node, when node 110 enters into the micro-sleep mode. Upon receipt of the link-level broadcast from node 110 (act 650), the neighboring node (e.g., node B, D, or E in the example above) may set a timer 260 to count the time period (T+ϵ), where ϵ represents a value to compensate for transmission time and clock skew (act 655). The neighboring node may then buffer all packets destined for node 110 (act 660) until timer 260 has expired (act 665). Once timer 260 has expired, the neighboring node may resume transmission of packets to node 110 (act 670).

Assume that node 110 selects the mecro-sleep mode in act 410. As set forth above, mecro-sleep includes reliable application level notification to support prolonged sleep periods. In the mecro-sleep mode, since the node is going to sleep for a longer period of time, the node can afford to spend more energy to tell each of its neighbors individually that it is going to sleep.

Figure 7A:
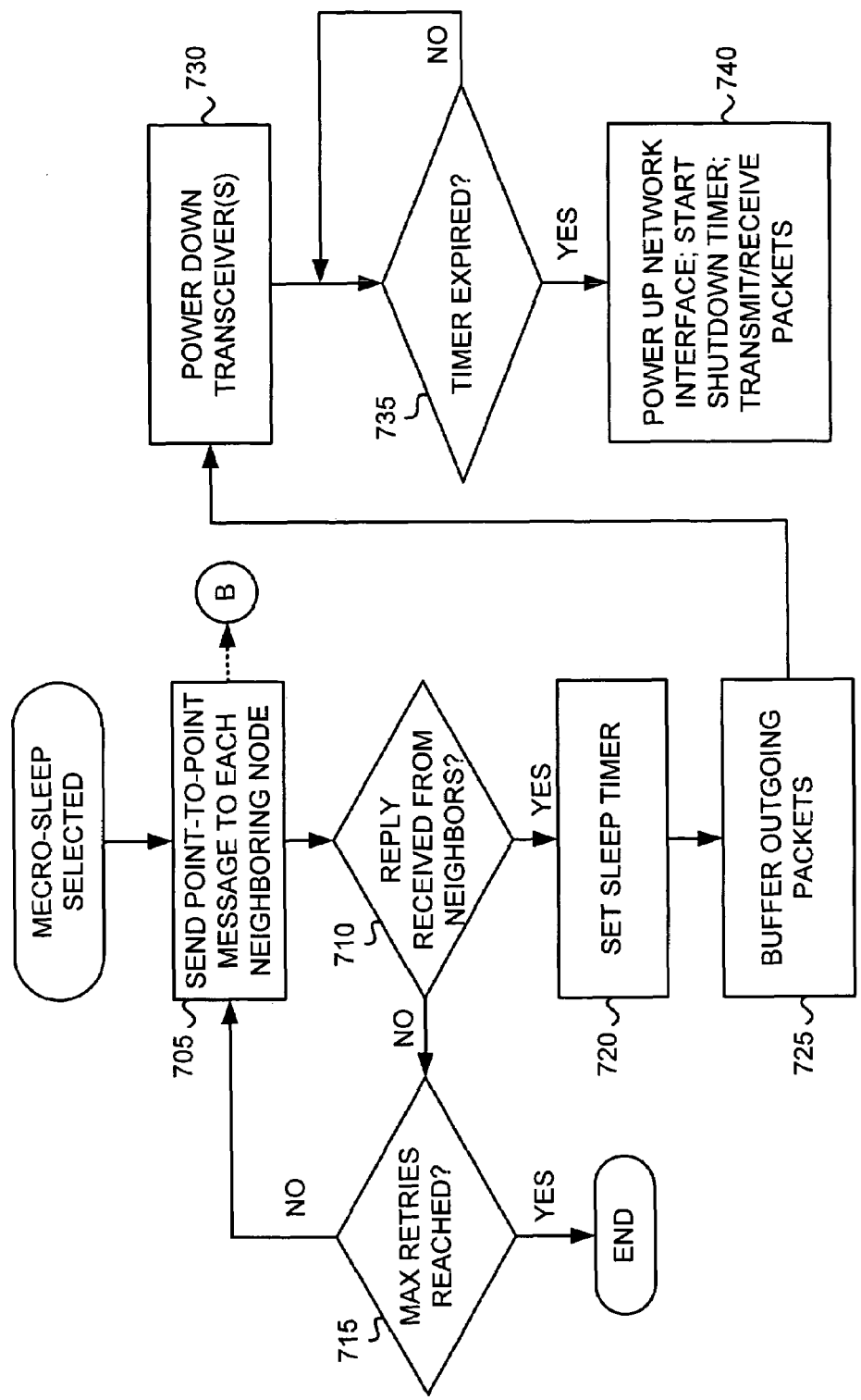

FIG. 7A illustrates an exemplary process for conserving energy in the mecro-sleep mode in an implementation consistent with the principles of the invention. Upon selection of the mecro-sleep mode, node 110 may transmit an application level message (also referred to hereinafter as a "point-to-point message") to each of node 110's neighbors (act 705). For example, assuming node A in FIG. 1 is the node entering into mecro-sleep, node A may send an application level message to each of its neighbors, namely nodes B, D, and E. In one implementation consistent with the principles of the invention, the application level message may include the link-layer address of node 110 and its sleep duration T.

Node 110 may not enter into the mecro-sleep mode until node 110 has received a message acknowledging receipt of the application level message back from each of the neighboring nodes. Node 110 may determine whether an acknowledgment message has been received from each neighboring node (act 710). If an acknowledgement message has not been received from each neighboring node, node 110 may determine if the maximum number of retries has been exceeded (act 715). If so, processing may end. If the maximum number of retries has not been exceeded, processing may return to act 705 with node 110 transmitting another point-to-point message to each neighboring node.

Once an acknowledgement message has been received from each neighboring node, node 110 may then set a timer, such as clock 260 (FIG. 2), to the amount of time T that node 110 will remain in the mecro-sleep mode (act 720). In one implementation consistent with the principles of the invention, the time period T may be on the order of minutes. Node 110 may then buffer all outgoing packets (act 725) and power down transceiver(s) 340 (act 730). Node 110 may wait until timer 260 has expired (act 735). Once expired, node 110 may power up transceiver(s) 340, start a timer to track the amount of time between shutdowns, and begin transmitting and receiving packets via transceiver(s) 340 (act 740).

Figure 7B:
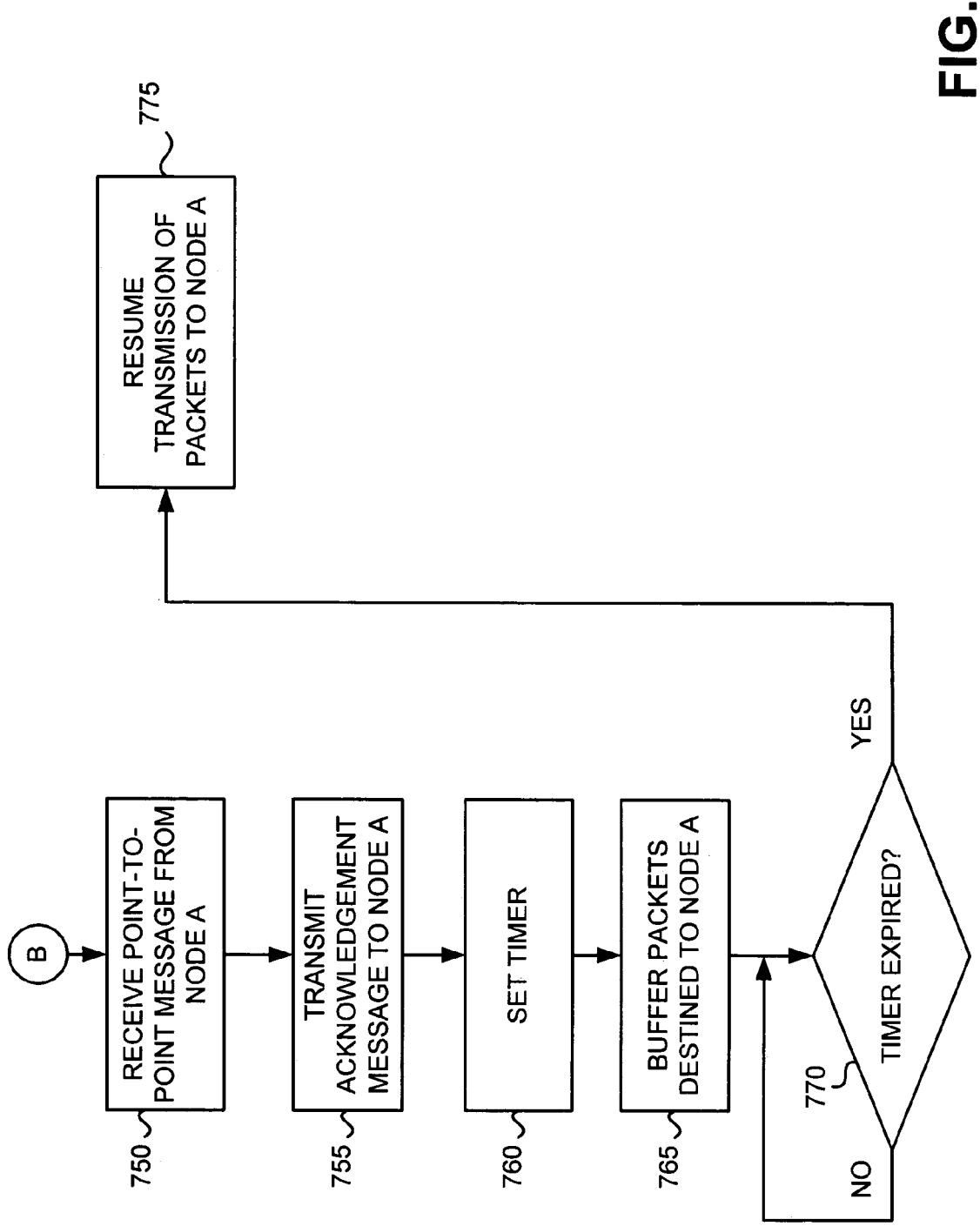

FIG. 7B illustrates an exemplary process, performed by a neighboring node, when node 110 enters into the mecro-sleep mode. Upon receipt of the application level message from node 110 (act 750), the neighboring node (e.g., node B, D, or E in the example above) may transmit an acknowledgement message to node 110 that verifies receipt of the application level message (act 755). The neighboring node may then set a timer 260 to count the time period (T+ϵ), where ϵ represents a value to compensate for transmission time and clock skew (act 760). The neighboring node may then buffer all packets destined for node 110 (i.e., node A) (act 765) until timer 260 has expired (act 770). Once timer 260 has expired, the neighboring node may resume transmission of packets to node 110 (act 775).

Assume that node 110 selects the macro-sleep mode in act 410. As set forth above, node 110 may select macro-sleep when node 110 intends to sleep for an extended period of time (e.g., hours or days). In the macro-sleep mode, since the node is going to sleep for long period of time, the node can afford to spend more energy to tell each of its neighbors individually that it is going to sleep.

Figure 8A:
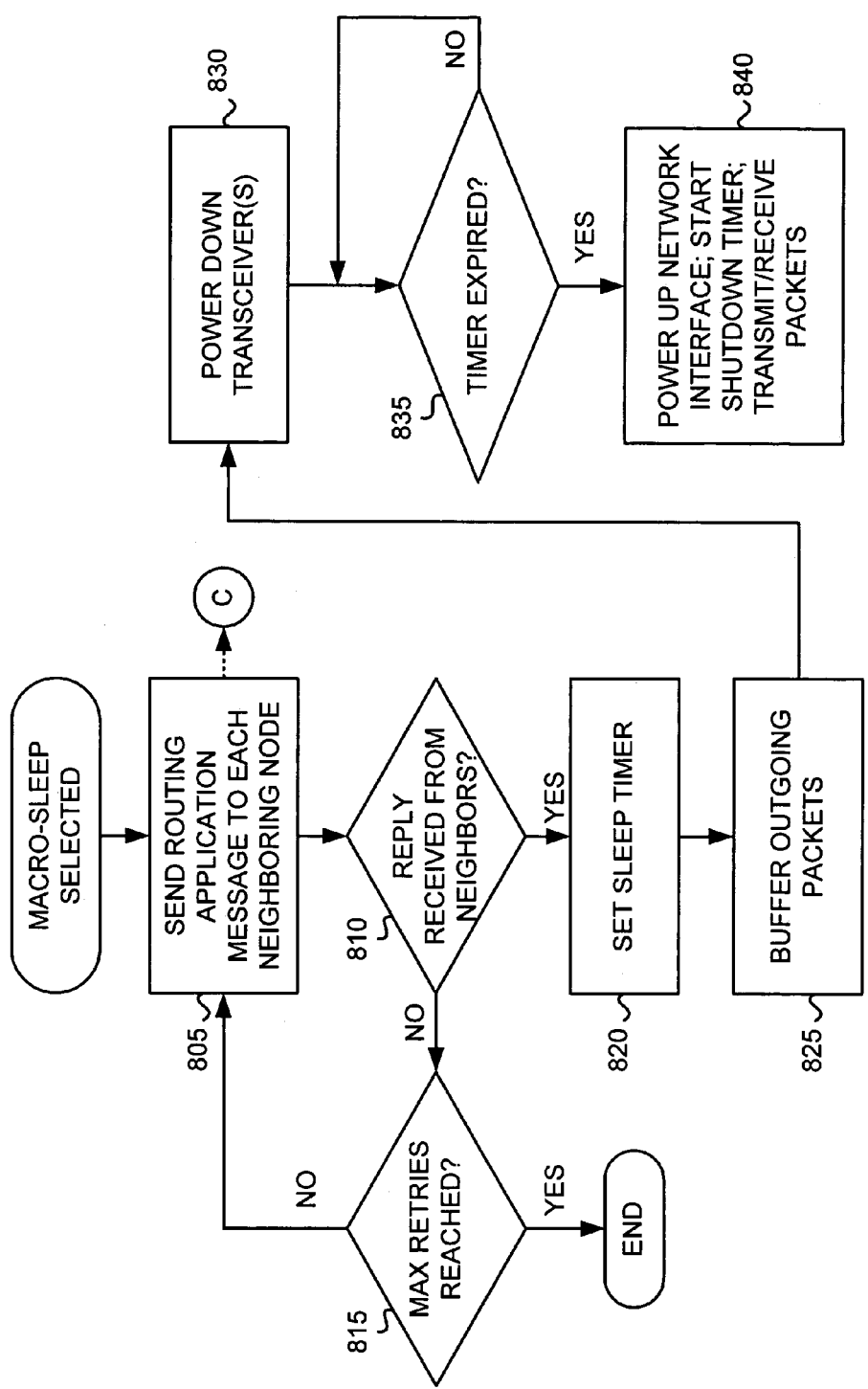

FIG. 8A illustrates an exemplary process for conserving energy in the macro-sleep mode in an implementation consistent with the principles of the invention. Upon selection of the macro-sleep mode, node 110 may transmit a routing application message to each of node 110's neighbors (act 805). For example, assuming node A in FIG. 1 is the node entering into macro-sleep, node A may send a routing application message to each of its neighbors, namely nodes B, D, and E. In one implementation consistent with the principles of the invention, the routing application message may include the link-layer address of node 110 and its sleep duration T.

Node 110 may not enter into the macro-sleep mode until node 110 has received a message acknowledging receipt of the routing application message back from each of the neighboring nodes. Node 110 may determine whether an acknowledgment message has been received from each neighboring node (act 810). If an acknowledgement message has not been received from each neighboring node, node 110 may determine if the maximum number of retries has been exceeded (act 815). If so, processing may end. If the maximum number of retries has not been exceeded, processing may return to act 805 with node 110 transmitting another point-to-point message to each neighboring node.

Once an acknowledgement message has been received from each neighboring node, node 110 may then set a timer, such as clock 260 (FIG. 2), to the amount of time T that node 110 will remain in the macro-sleep mode (act 820). In one implementation consistent with the principles of the invention, the time period T may be on the order of hours or days. Node 110 may then buffer all outgoing packets (act 825) and power down transceiver(s) 340 (act 830). Node 110 may wait until timer 260 has expired (act 835). Once expired, node 110 may power up transceiver(s) 340, start a timer to track the amount of time between shutdowns, and begin transmitting and receiving packets via transceiver(s) 340 (act 840).

Figure 8B:
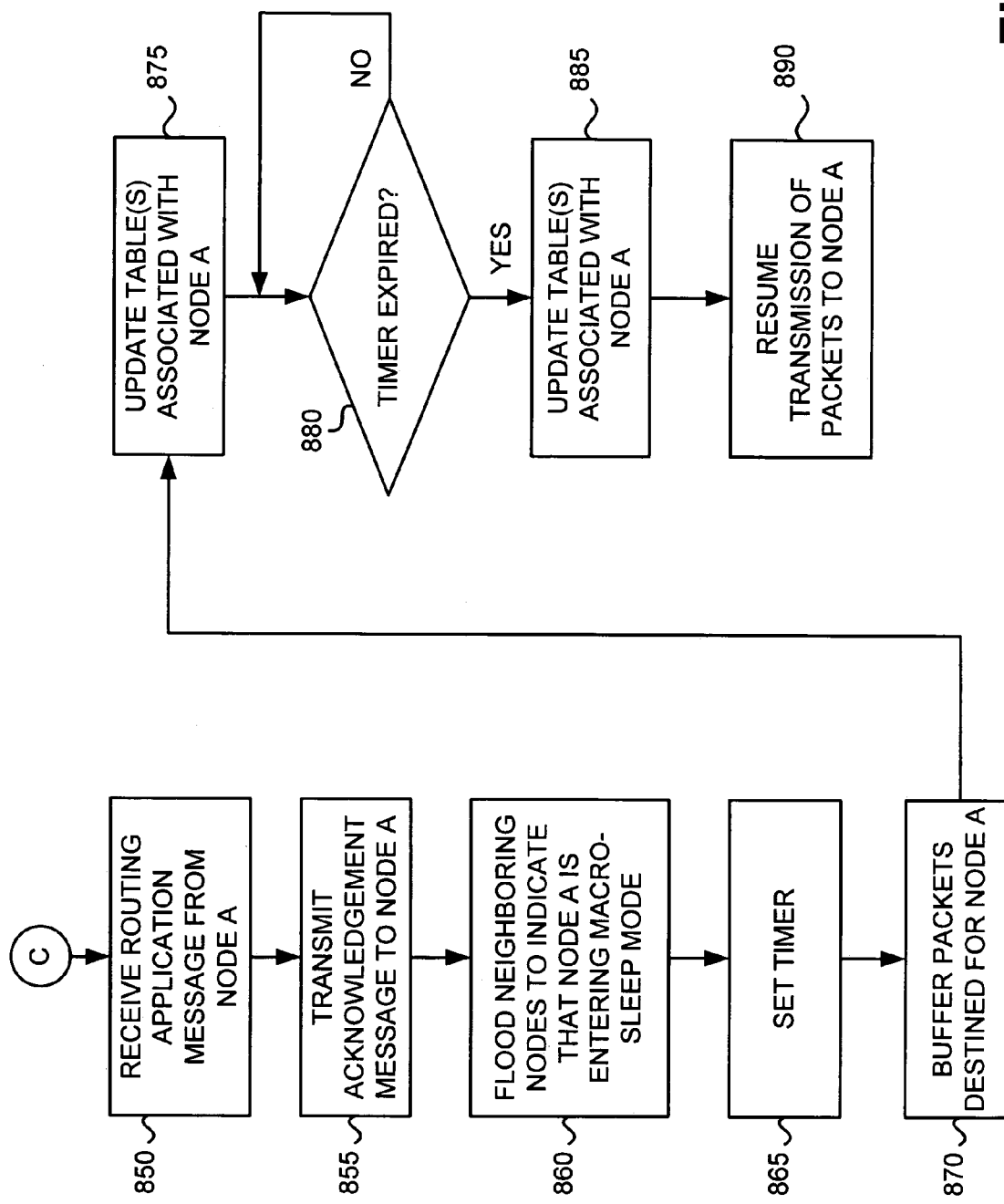

FIG. 8B illustrates an exemplary process, performed by a neighboring node, when node 110 enters into the macro-sleep mode. Upon receipt of the routing application message from node 110 (act 850), the neighboring node (e.g., node B, D, or E in the example above) may transmit an acknowledgement message to node 110 that verifies receipt of the routing application message (act 855). The neighboring node may then reliably transmit (or "flood") to each of its neighbors (except the node from which the notification message was received) that node 110 is going to sleep (act 860). Additionally, the flooding may be chosen to be performed unreliably. Since all nodes are flooding to all neighbors, in a dense network, a missed packet to one neighbor may wind up being transmitted from another neighbor.

The neighboring node may then set a timer 260 to count the time period (T+ε), where ε represents a value to compensate for transmission time and clock skew (act 865). The neighboring node may buffer all packets destined for node 110 (act 870). The neighboring node may also update any tables that reference node 110 (act 875). In one implementation consistent with the principles of the invention, the neighboring node may remove node 110 and links to node 110 from its routing and/or forwarding tables and may store this information in, for example, memory 220. Alternatively, node 110 may update its routing and forwarding tables to indicate that node 110 and links to node 110 are not available for transmission. Once timer 260 has expired (act 880), the neighboring node may automatically re-insert node 110 into the appropriate tables or indicate that node 110 is available (act 885) and resume transmission of packets to node 110 (act 890).

The macro-sleep mode not only benefits the sleeping node (i.e., node 110) by allowing node 110 to conserve power, but also improves network performance. Normally, if a node, such as node 110, powers down, node 110's neighbors would independently detect that node 110 is not in network 100 and each neighbor would independently flood a message throughout network 100 alerting other nodes that the link to node 110 is gone. Therefore, if node 110 had 20 neighboring nodes, there would be 20 messages flooded through network 100 using up valuable network resources. When node 110 eventually powers back up, each neighbor would independently detect the new link and flood a message alerting other nodes in network 100 of the newly detected link. Again valuable network resources would be used to send these messages. Implementations consistent with the principles of the invention avoid the transmission of these alert messages by informing neighboring nodes of the intended power down prior to entering into the macro-sleep mode. Since the neighboring nodes will know when the node intends to power back up, the need to flood messages regarding the powered up node is avoided.

A simulation was performed to illustrate the tradeoff between the nano-sleep and micro-sleep modes. The simulation model was a realistic model of an IEEE 802.11-type radio with RTS/CTS/Data/ACK capabilities based on the parameters specified in Table 1. The node's transceiver power requirements, depending on its operational mode, are specified in Table 2.

TABLE 1

Transceiver parameters

| Parameter | Value |
| --- | --- |
| Transmission Rate | 2 Mb/s |
| FEC Rate | 0.5 |
| Effective Data Rate | 1 Mb/s |
| Frequency | 400 MHz |
| Transmit Power | 200 mW |
| Antenna Gain | 0 dB |

TABLE 2

Radio power requirements

| Radio Mode | Power (mW) |
| --- | --- |
| Transmit | 2,800.0 |
| Listen/Receive | 835.0 |
| Sleep | 40.5 |

Along with the radio model, each node in the simulation model featured a driver that had the ability to shutdown the transceiver to support the energy-conserving reception protocols and a link-metric calculator that performed signal processing on the information provided by the transceiver to generate the link statistics necessary for routing. Finally, the routing module operated based on a proactive link-state protocol.

The performance of the nano-sleep and micro-sleep protocols were evaluated based on the statistical results obtained from the simulation model. First, the effect of the two main protocol control parameters—the Shutdown Throughput Bound (STHB) and the Shutdown Duration Bound (SDB) (i.e., the sleep duration T)—on the energy consumption and throughput of nodes and the number of dropped packets were evaluated. A packet was considered dropped when the node trying to transmit it to a sleeping neighbor reached the maximum allowed retransmission attempts. Such an event was classified as a radio error. The STMB was set to 0.5 seconds to allow nodes to update their throughput statistics, so as to make informed decisions on whether to go to sleep again after the STMB elapses.

The following simulation results are based on the following simulation scenario:
Network: 6×6 (36-node) grid;
User traffic: 10 packets/second, 500 bits/packet; and
Path length: 10 hops.

The duration of each run was 300 simulated seconds and the results were averaged over 3 runs for each data point. Traffic was generated by a node in one corner of the grid and was destined for the node in the diagonally opposite corner. This is a worst-case scenario for the 36-node grid topology since all packets traverse the diameter of the network (10 hops), which maximizes the probability of a packet encountering a sleeping node along its path and being delayed or dropped.

Figure 9:
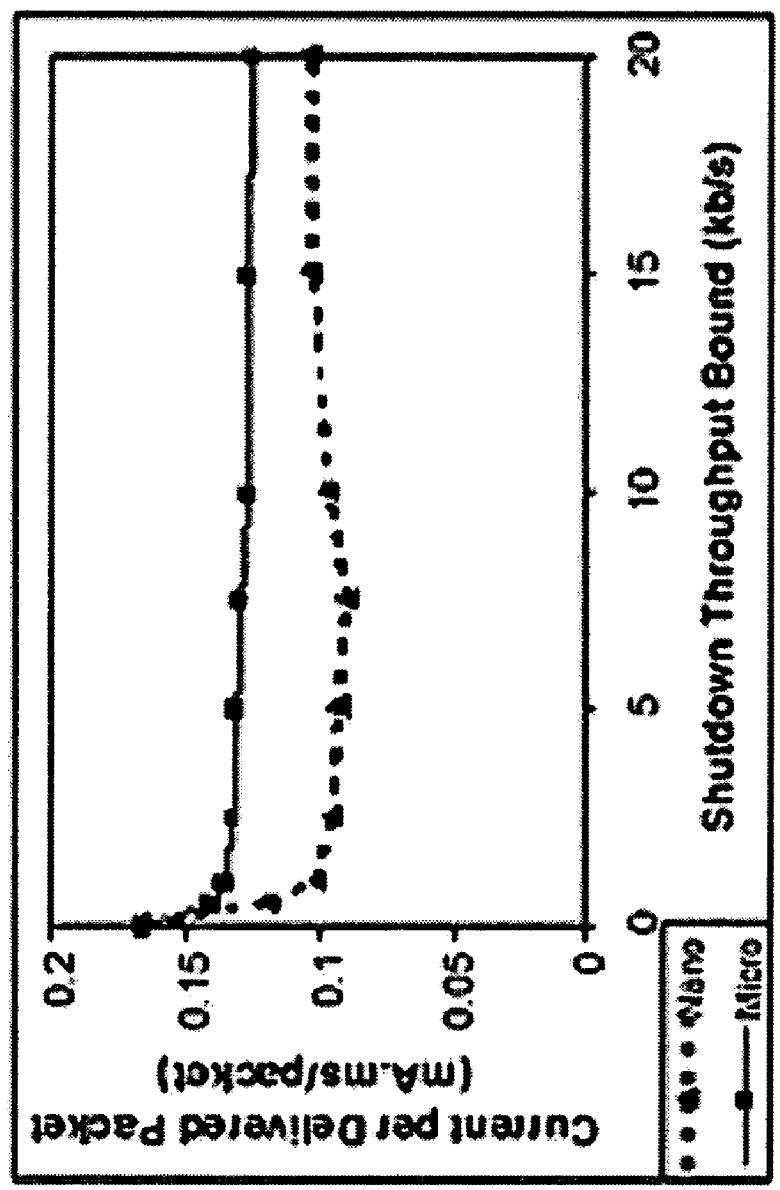
FIGS. 9-21B illustrate simulation results showing the benefits of the energy conservation techniques consistent with the principles of the invention.
Figure 10:
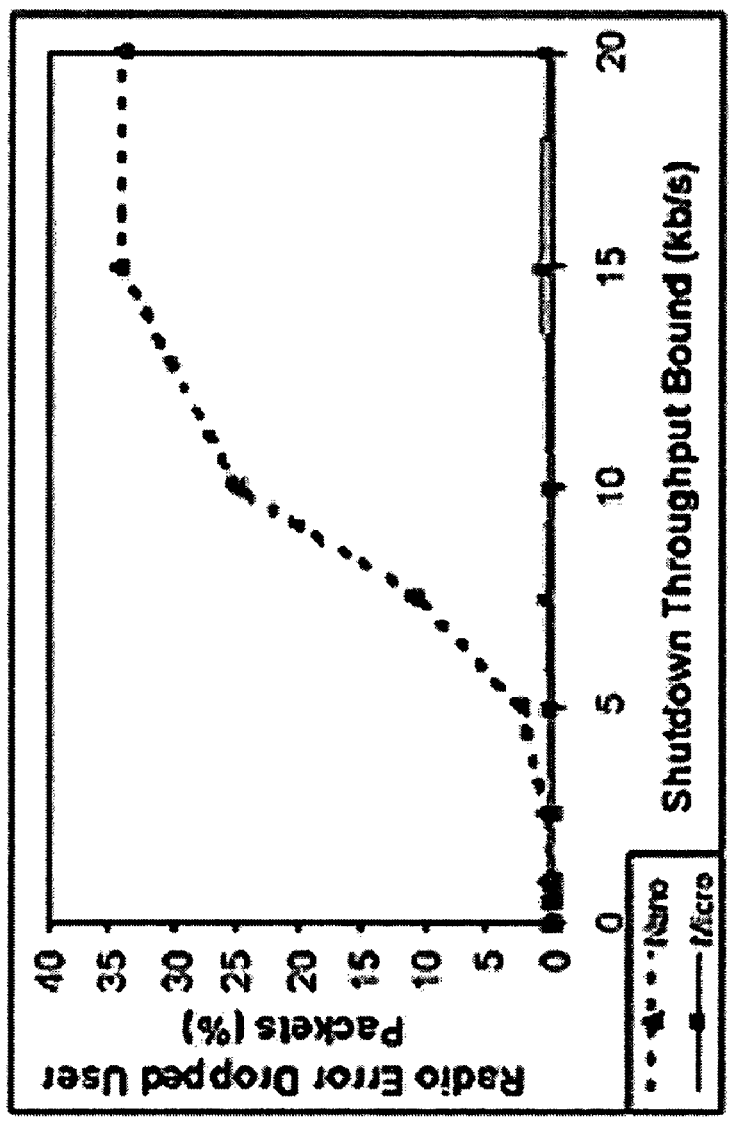
Figure 11:
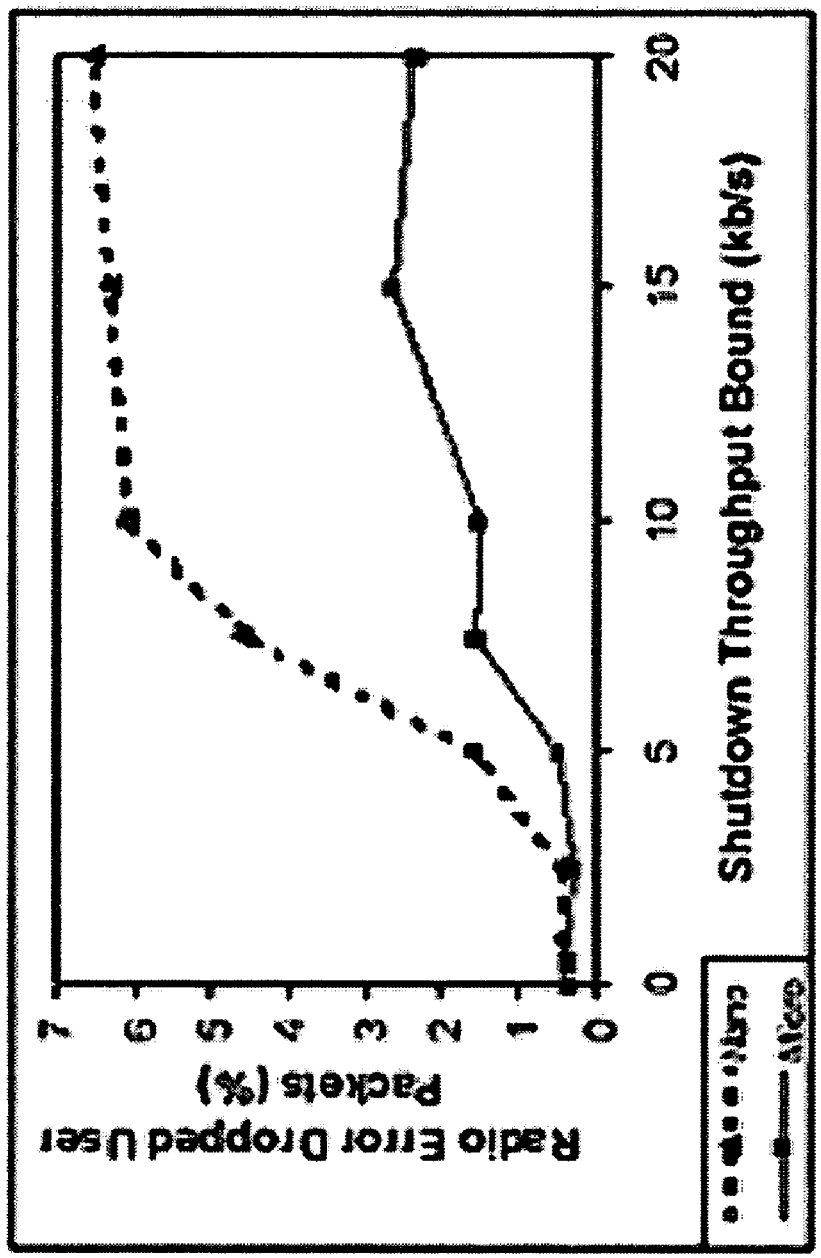

The results presented in FIG. 9 show that the nano-sleep mode is more efficient with respect to STHB, with a STHB between 2.5 kb/s and 7.5 kb/s, which represents 50-125% of the offered user traffic load. A STHB in this range discourages nodes carrying user traffic from shutting down, whereas all other nodes sleep as often as possible only limited by SDB and STMB. However, the packet loss rate, as illustrated in FIG. 10, shows that an STHB of more than 50% offered load leads to a significant increase of dropped, packets, while no appreciable energy reduction is achieved. The micro-sleep mode, on the other hand, exhibits a more stable behavior with insignificant packet loss (resulting from nodes buffering packets for their sleeping neighbors) over the entire range of STHB values. This may suggest in certain implementations consistent with the principles of the invention that STHB may be an unnecessary control parameter for the micro-sleep protocol. Although the STHB parameter does not affect the packet drop rate, it does suppress retransmissions, as illustrated in FIG. 11, when below 50% of the offered traffic load. Overall, with an STHB at 50% of offered traffic load, energy consumption was reduced by 42% with the nano-sleep mode and by 20% with the micro-sleep mode, while reliable delivery continued to be maintained with average packet drop rates below 0.17% for the nano-sleep mode and 0% for the micro-sleep mode.

The significant improvement in energy efficiency in the simulation is due to the regular periodic shutdown of the 25 nodes that do not carry any user traffic. As they observe a throughput that is less than the STHB, they spend most of the time in a sleep state. On the other hand, the continued reliable packet delivery is a result of the 11 nodes carrying user traffic observing a traffic load higher than STHB, which prevents them from shutting down and causing packets to be dropped. As the STHB is increased above the offered traffic load (i.e., 5 kb/s), a continued reduction of consumed energy as the carriers of user traffic are also allowed to shut down was observed. This, however, leads to a significant increase of the packet-drop rate, which is particularly prominent for the nano-sleep mode. As evident from FIGS. 9-11, the STHB parameter is an effective tool for precluding heavily loaded nodes from shutting down in the nano-sleep mode, thus forcing them to maintain reliable packet delivery. In the micro-sleep mode, on the other hand, the STHB parameter has little effect on the drop rate, since it is constrained by suspending transmissions to sleeping nodes until they awake. The STHB parameter is still useful for suppressing the retransmission rate.

Figure 12:
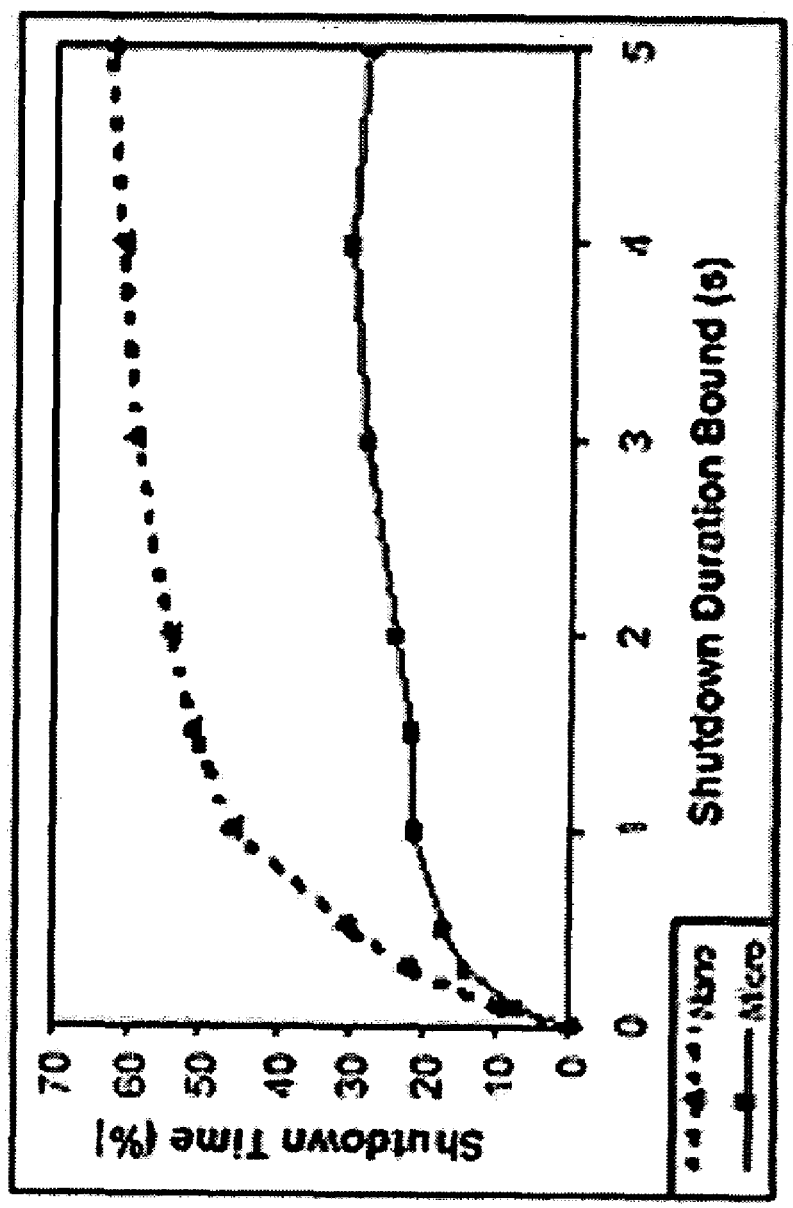
Figure 13:
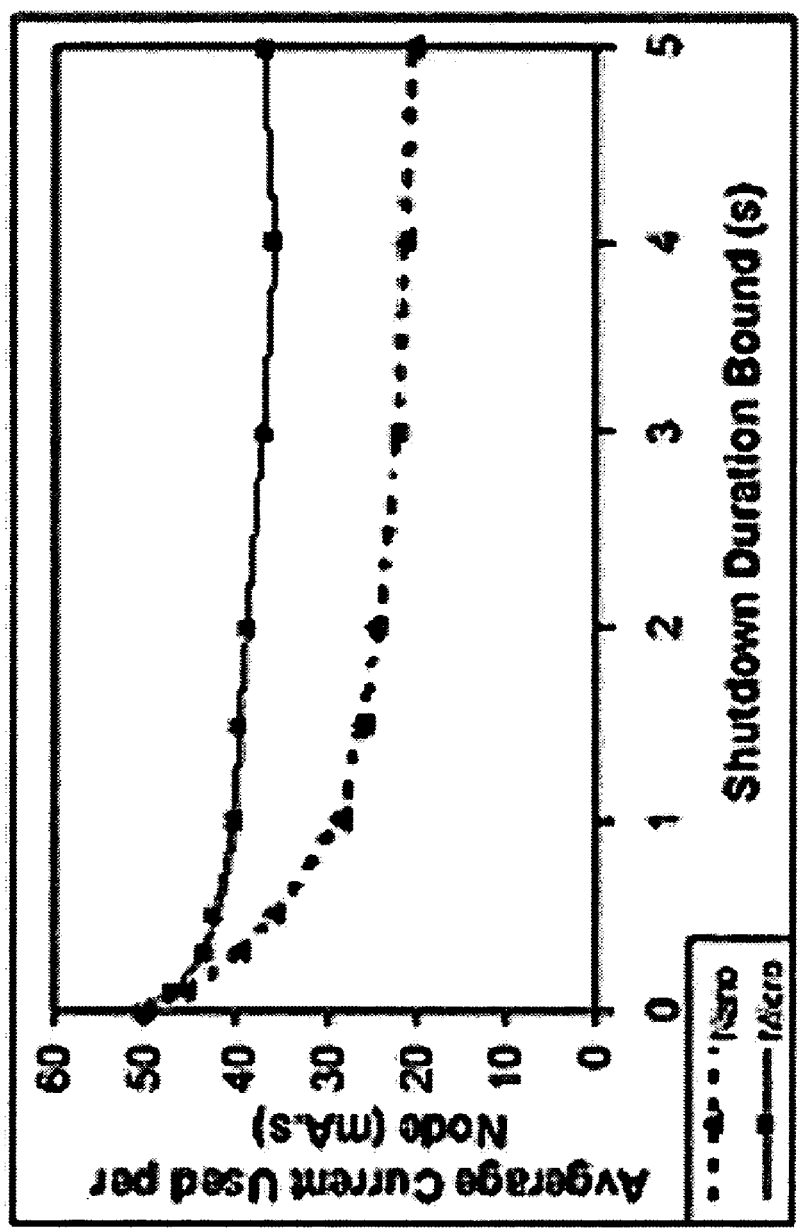
Figure 14:
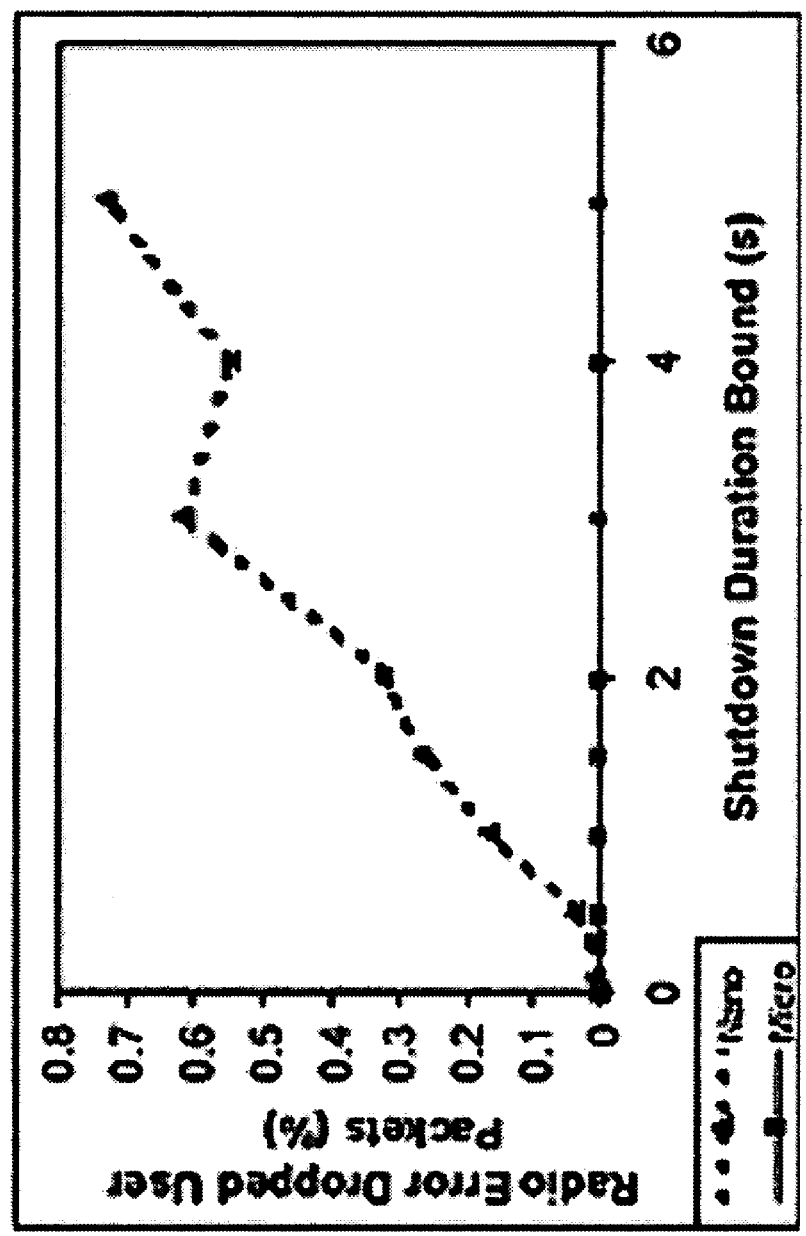

Next, the SDB parameter (sleep duration) was evaluated. In this simulation, the STHB parameter was set to 2.5 kb/s. Increasing SDB allows nodes to shut down for longer periods, as illustrated in FIG. 12. Consequently, as illustrated in FIG. 13, consumed energy decreases up to approximately 60% for the nano-sleep mode and 29% for the micro-sleep mode. With the nano-sleep mode, an increasing trend in the packet drop rate was also observed, as illustrated in FIG. 14. The packet drop rate remains well below 1%, however, which is a small penalty for the significant reduction of consumed energy.

Figure 15:
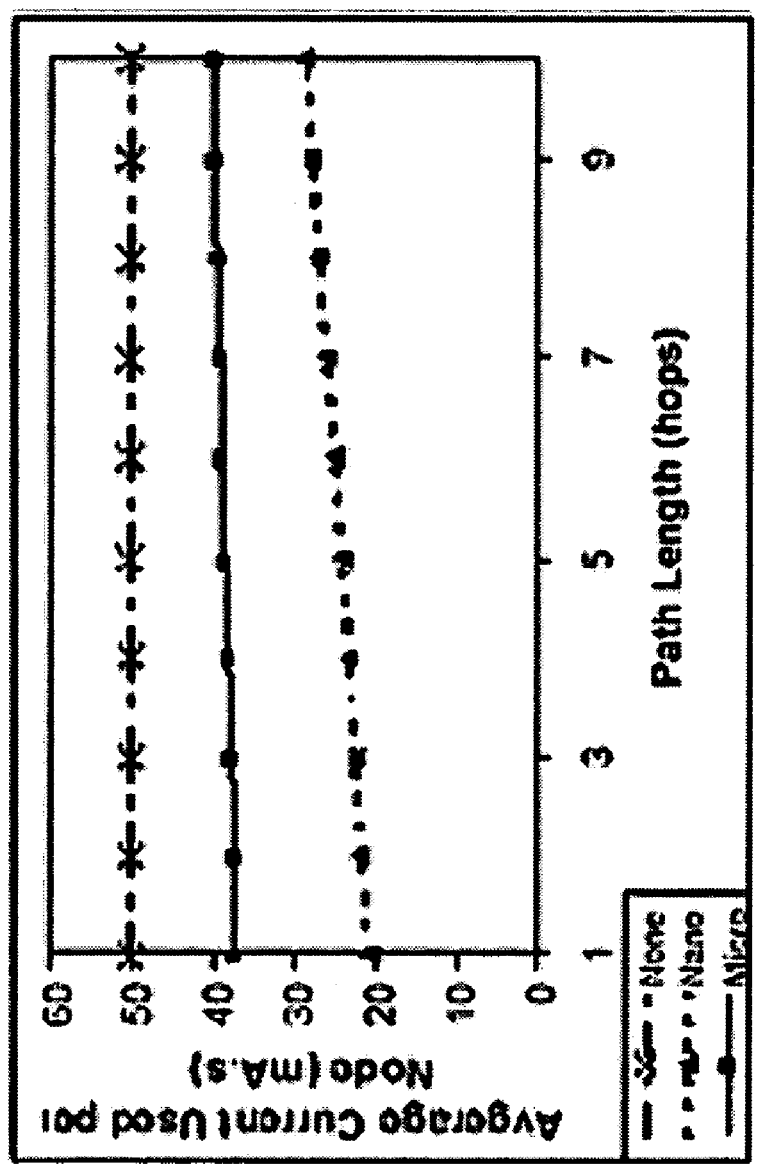
Figure 16:
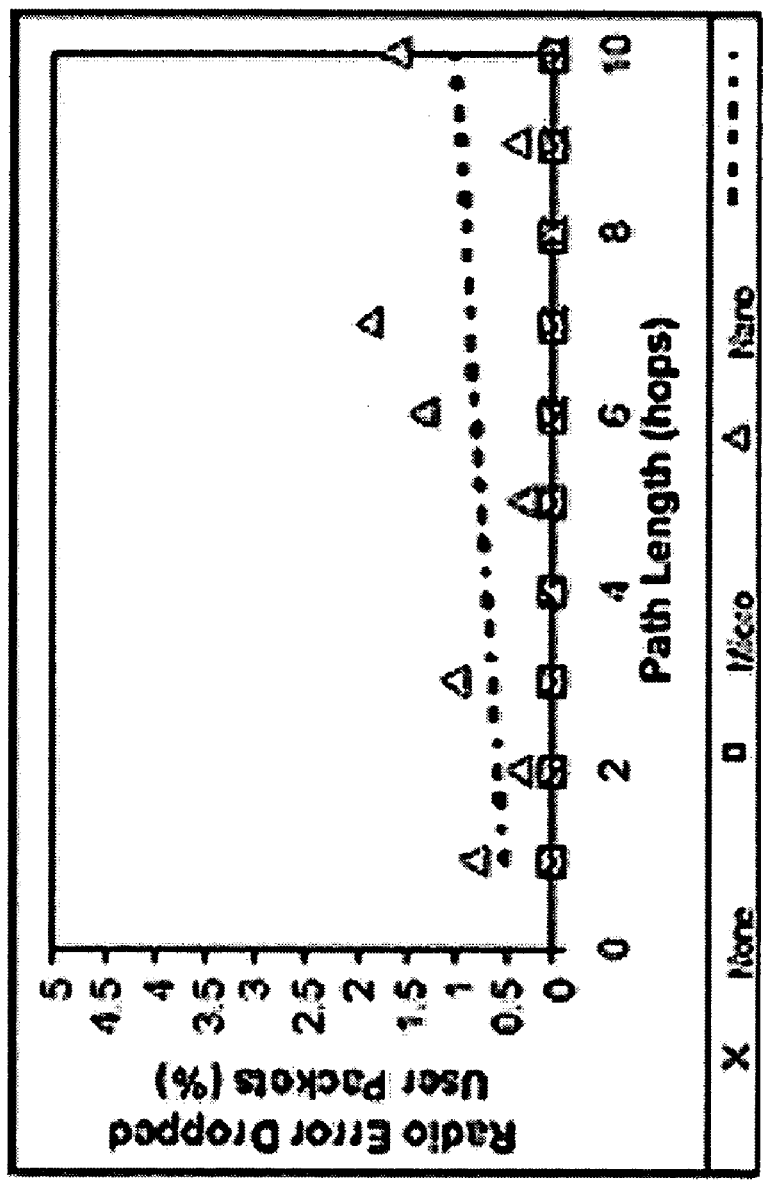

The simulation also examined how the protocols' performance is affected by the traffic pattern. One aspect of the traffic distribution is the average path length. To evaluate this parameter, a scenario with the SDB set to 1 second and the STHB parameter set to 2.5 kb/s was used. As illustrated in FIG. 15, when no reception protocol is employed, the average energy consumption of the nodes is practically independent of the path length, since nodes never shut down and their idle-time energy consumption dominates for transmission/reception of user traffic. Conversely, when a reception protocol is employed, the idle-time consumption is significantly reduced and the influence of the path length becomes more pronounced. As path length increases, more nodes are loaded with user traffic and hence, prevented from shutting down. Overall, an energy reduction of 43-59% was observed for the nano-sleep mode and 20-26% for the micro-sleep mode, depending on the path length. As illustrated in FIG. 16, when reception protocols are employed, packet delivery continues to be reliable, independent of the path length with packet drop rates less than 2% for the nano-sleep mode and 0% for the micro-sleep mode.

Figure 17:
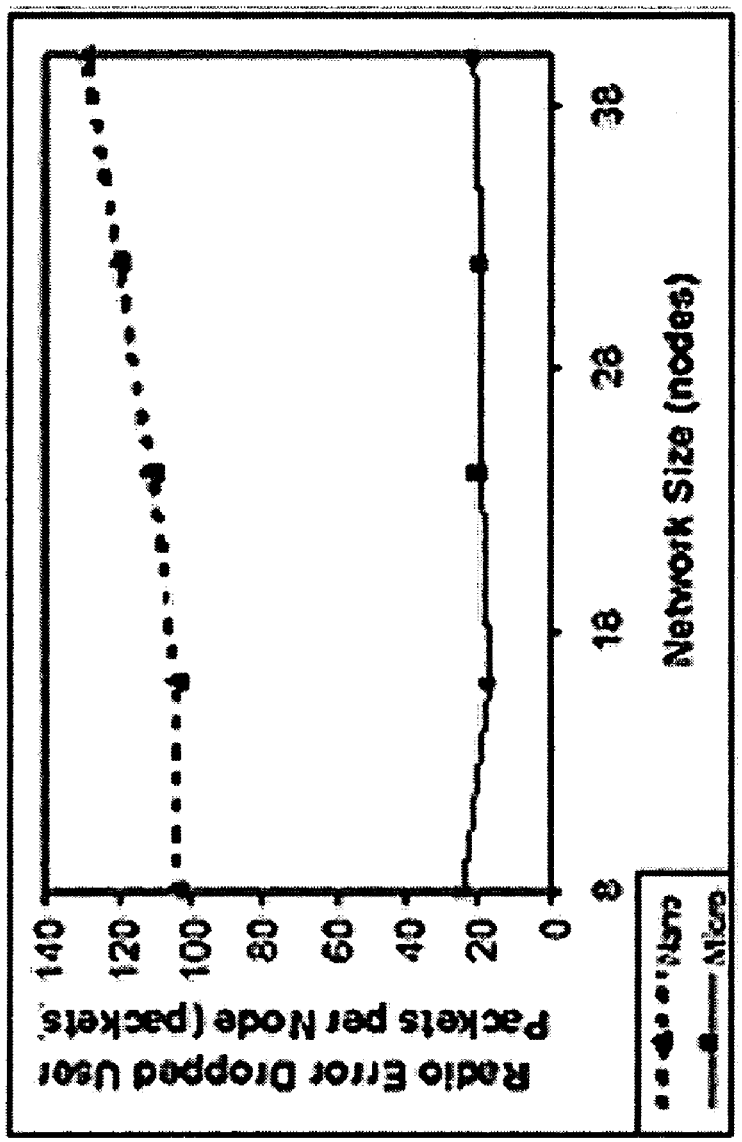
Figure 18:
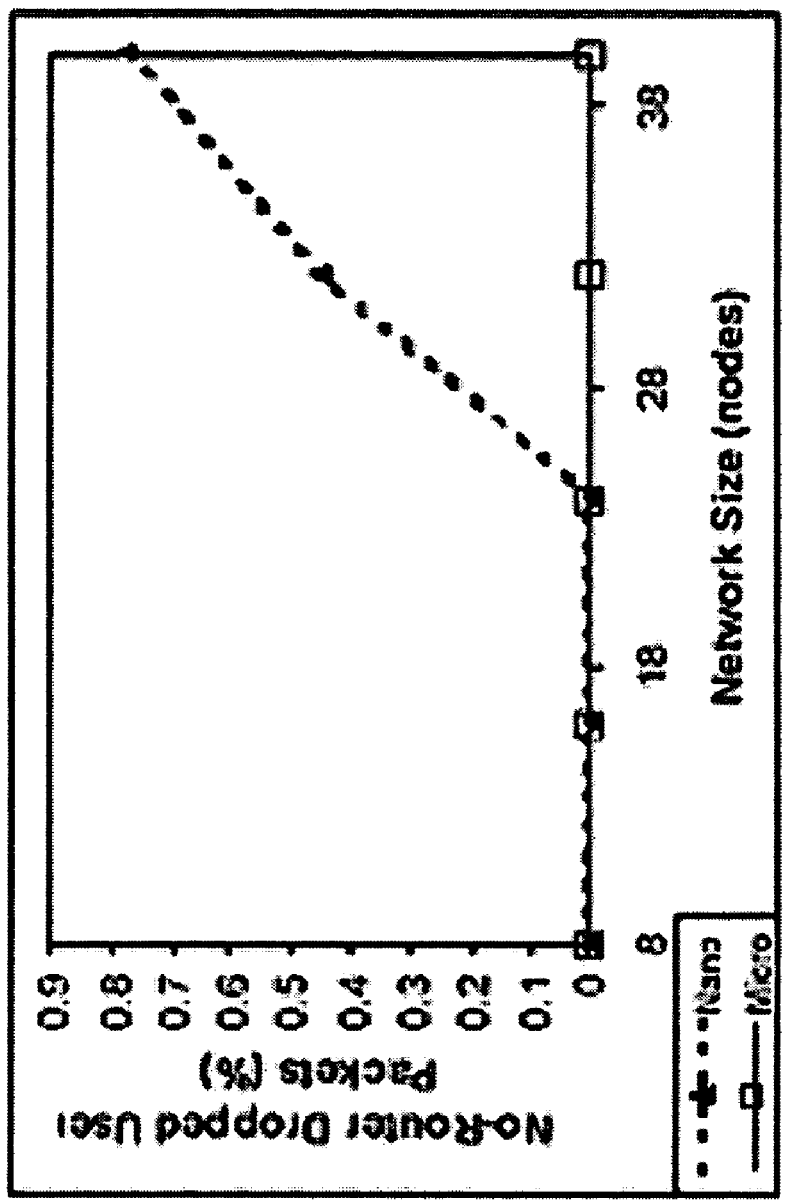

The protocols' scalability (i.e., how their performance depends on the network size) was also examined. In this simulation scenario, the offered load was increased proportionately to the number of nodes to maintain a constant relative load. Since communicating node pairs were selected uniformly across the network, the average path length increases as the network grows. As illustrated in FIG. 17, the packet drop rate increases with the network size for the nano-sleep mode, but remains relatively constant for the micro-sleep mode. In addition, FIG. 18 shows that the nano-sleep mode also suffers from packets being dropped due to the lack of routes to some destinations, which indicates that nodes do not have all the necessary routing information available. This is a consequence of packets carrying this information being dropped at a rate that is proportional to the path length (or equivalently; network size). Thus, the more distant the nodes, the more likely it becomes that they do not have routing information about each other.

Figure 19A:
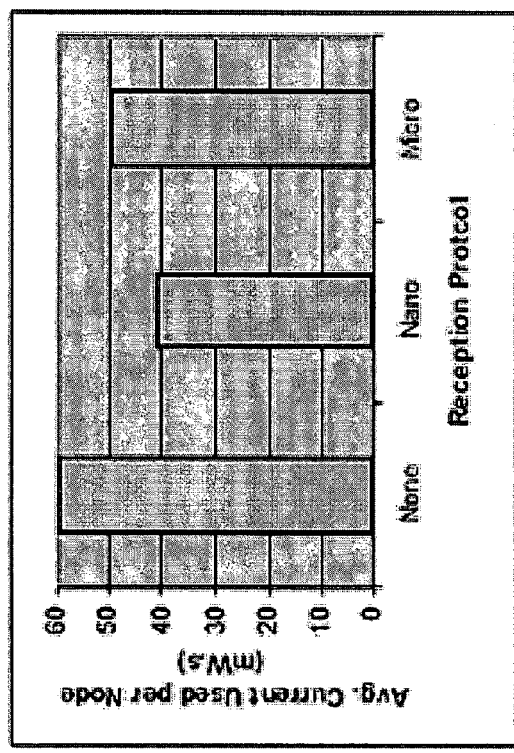
Figure 19B:
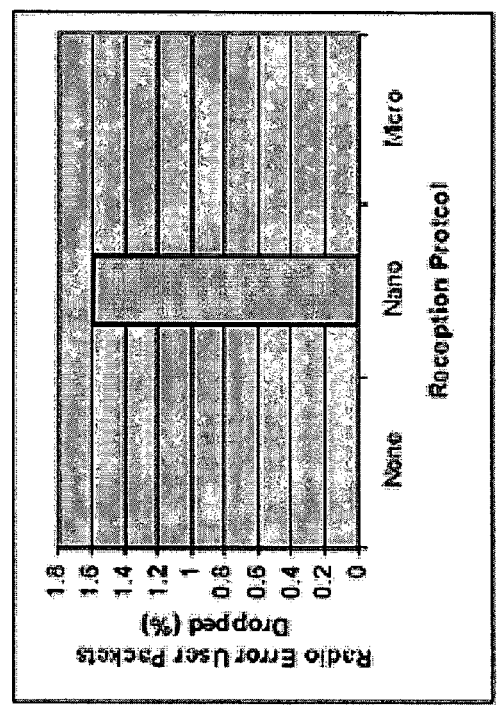

In another simulation scenario, the nano-sleep and micro-sleep modes were evaluated with two traffic patterns that commonly occur in sensor networks. The first traffic pattern scenario models a sensor grid with a moving target passing through or alongside it. The communication activity of the sensor field in the simulation propagated along the grid in a wave-like fashion as nodes exchanged transmissions while the target was in proximity to them, then become silent as it moved away. In this first scenario, the simulation consisted of a 3×12 node rectangular grid with 3×3 node square regions randomly exchanging packets at a rate of 10 500-bit packets/sec. As illustrated in FIGS. 19A and 19B, power consumption was reduced by 31% for the nano-sleep mode and by 17% for the micro-sleep mode with packet loss rates of 1.6% and 0%, respectively.

Figure 20A:
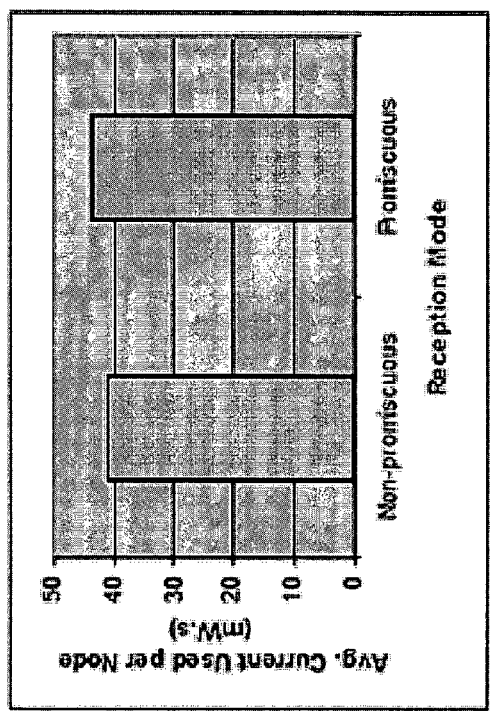
Figure 20B:
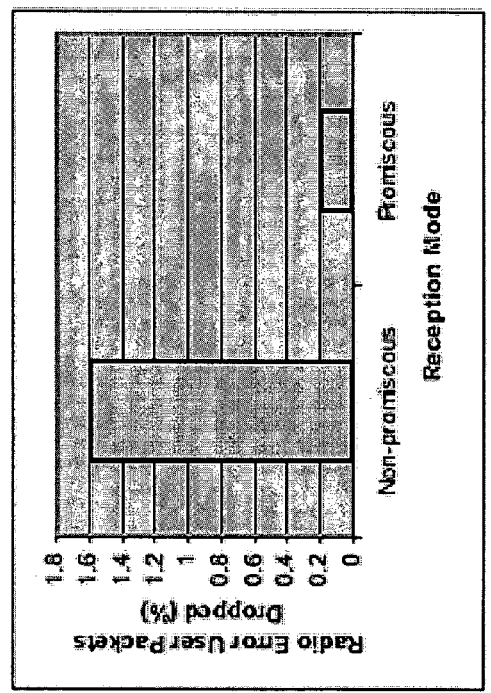

In this first scenario, nodes that had not yet detected the moving target deduced its arrival by overhearing the communication activity of nodes in their vicinity. Observing this fact, the nano-sleep protocol was augmented with an additional configuration parameter that specifies whether overheard transmissions should be counted towards the STHB. The two results modes were referred to as promiscuous and non-promiscuous. Introducing a promiscuous mode in such settings reduced packet loss from 1.6% to 0.2% with little additional power, as illustrated in FIGS. 20A and 20B. In promiscuous mode, the nano-sleep mode still exhibited lower power consumption than the micro-sleep mode, while packet loss was virtually equivalent between the two modes.

Figure 21A:
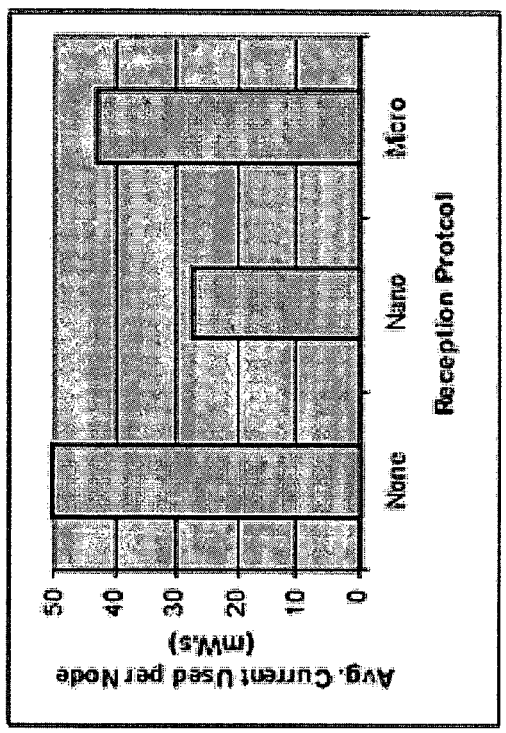
Figure 21B:
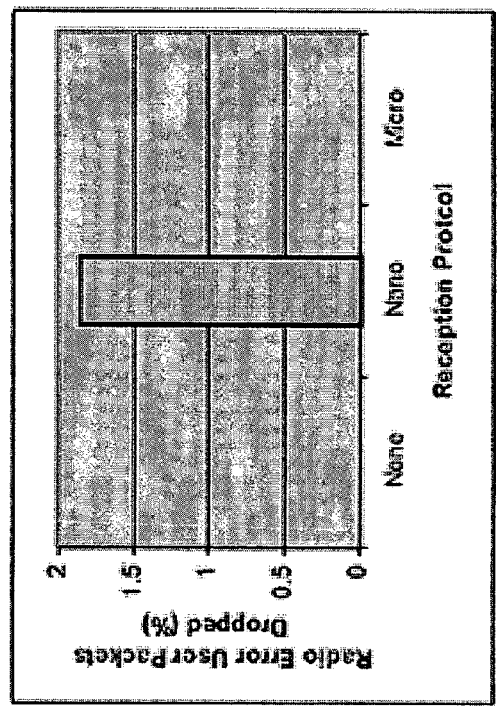

The second simulation scenario modeled a sensor field of randomly distributed nodes monitoring environmental parameters. Regions of the field were set to become active randomly for 10-second intervals with nodes transmitting streams of data at 10 500-bit packets/second to a central node responsible for processing data in the active region. In such a scenario, the nano-sleep mode provided energy savings of 45% and the micro-sleep mode provided energy savings of 15%, with packet losses of 1.8% and 0%, respectively, as illustrated in FIGS. 21A and 21B.

From the foregoing simulations, it appears that the nano-sleep and micro-sleep modes exhibit a consistent behavior providing energy savings of at least 31% for the nano-sleep mode and 15% for the micro-sleep mode, and possibly up to 59% and 29%, respectively. Packet loss may be limited to less than 2% for the nano-sleep mode and appears non-existent for the micro-sleep mode. This shows that significant energy savings can be attained with little additional protocol complexity, additional hardware costs, and little or no packet-loss penalties.

CONCLUSION

Implementations consistent with the principles of the invention provide energy conservation techniques that allowed prolonged operation of nodes in a decentralized, wireless mobile network having limited power supplies. Each node may select an appropriate sleep mode based on observed conditions in the network and within the nodes themselves.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4-8B, the order of the acts may be varied in other implementations consistent with the principles of the invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A communications network comprising:
a first node that comprises at least one transceiver and is configured to:
observe one or more conditions in at least one of the communications network or the first node,
select a sleep mode of a plurality of sleep modes based on the observed one or more conditions, each sleep mode of the plurality of sleep modes being associated with a different powering down procedure and a sleep duration;
power down the at least one transceiver for the sleep duration and according to the powering down procedure associated with the selected sleep mode; and
where the plurality of sleep modes includes at least four sleep modes,
where in response to selecting a first sleep mode of the at least four sleep modes, the first node, when powering down, is configured to:
set a sleep timer to a first period of time,
buffer outgoing packets, and
power down the at least one transceiver for the first period of time, and
where in response to selecting a second sleep mode of the at least four sleep modes, the first node, when powering down, is configured to:
transmit a link-level broadcast to at least one neighboring node,
set the sleep timer to a second period of time, the second period of time being longer than the first period of time,
buffer outgoing packets, and
power down the at least one transceiver for the second period of time; and a plurality of neighboring nodes.

2. The communications network of claim 1 where the one or more conditions include traffic volume, an amount of power remaining in a power supply associated with the first node, and an amount of time since the first node has powered down.

3. The communications network of claim 1 where the link-level broadcast includes information identifying the first node and the second period of time.

4. The communications network of claim 3 where the at least one neighboring node is configured to:
receive the link-level broadcast,
set a timer based on the second period of time, and
buffer packets destined for the first node until the timer expires.

5. The communications network of claim 1 where in response to selecting a third sleep mode of the at least four sleep modes, the first node, when powering down, is configured to:
transmit a point-to-point message to each of the at least one neighboring node, the point-to-point message causing each of the at least one neighboring node to transmit an acknowledgment message,
set the sleep timer to a third period of time in response to receiving the acknowledgement message from each of the at least one neighboring node, the third period of time being longer than the second period of time,
buffer outgoing packets, and
power down the at least one transceiver for the third period of time.

6. The communications network of claim 5 where the point-to-point message includes information identifying the first node and the third period of time.

7. The communications network of claim 6 where the at least one neighboring node is configured to:
receive the point-to-point message,
transmit the acknowledgement message to the first node in response to receiving the point-to-point message,
set a timer based on the third period of time, and
buffer packets destined for the first node until the timer expires.

8. The communications network of claim 5 where in response to selecting a fourth sleep mode of the at least four sleep modes, the first node, when powering down, is configured to:
transmit a routing application message to each of the at least one neighboring node, the routing application message causing each of the at least one neighboring node to transmit a second acknowledgment message, set the sleep timer to a fourth period of time in response to receiving the second acknowledgement message from each of the at least one neighboring node, the fourth period of time being longer than the third period of time,
buffer outgoing packets, and
power down the at least one transceiver for the fourth period of time.

9. The communications network of claim 8 where the routing application message includes information identifying the first node and the fourth period of time.

10. The communications network of claim 9 where the at least one neighboring node is configured to:
receive the routing application message,
transmit the second acknowledgement message to the first node in response to receiving the routing application message,
transmit a message to one or more neighboring nodes of the at least one neighboring node, the message informing the one or more neighboring nodes that the first node is entering the fourth sleep mode,
set a timer based on the fourth period of time,
remove the first node from one or more routing tables associated with the at least one neighboring node, and
buffer packets destined for the first node until the timer expires.

11. The communications network of claim 10 where the at least one neighboring node is further configured to:
make the first node available in the one or more routing tables after the timer expires.

12. A method for conserving power in a communications network, comprising:
monitoring, via a node in the communications network, one or more conditions in the communications network;
selecting, via the node, a sleep mode of a plurality of sleep modes based on the one or more conditions, each sleep mode of the plurality of sleep modes being associated with a unique powering down procedure and a different sleep duration; and
powering down the node for the sleep duration associated with the selected sleep mode and in accordance with the unique powering down procedure,
where the plurality of sleep modes includes at least four sleep modes,
where in response to the node selecting a first sleep mode of the at least four sleep modes, the powering down includes:
setting a sleep timer to a first period of time,
buffering outgoing packets, and
powering down at least one transceiver associated with the node for the first period of time, and
where in response to the node selecting a second sleep mode of the at least four sleep modes, the powering down the node for the sleep duration includes:
transmitting a link-level broadcast to one or more neighboring nodes,
setting the sleep timer to a second period of time, the second period of time being longer than the first period of time,
buffering outgoing packets, and
powering down the at least one transceiver for the second period of time.

13. The method of claim 12 where the one or more conditions include a traffic volume in the communications network, an amount of power remaining in a power supply associated with the node, and an amount of time since the node has powered down.

14. The method of claim 12 where the link-level broadcast includes information identifying the node and the second period of time.

15. The method of claim 14 where the method further comprises:
receiving the link-level broadcast at least one of the one or more neighboring nodes,
setting a timer based on the second period of time at the at least one of the one or more neighboring nodes, and
buffering, at the at least one of the one or more neighboring nodes, packets destined for the node until the timer expires.

16. The method of claim 12 where in response to the node selecting a third sleep mode of the at least four sleep modes, the powering down the node for the sleep duration includes:
transmitting a point-to-point message to each of the one or more neighboring nodes, the point-to-point message causing each of the one or more neighboring nodes to transmit an acknowledgment message,
setting the sleep timer to a third period of time in response to receiving the acknowledgement message from each of the one or more neighboring nodes, the third period of time being longer than the second period of time,
buffering outgoing packets, and
powering down the at least one transceiver for the third period of time.

17. The method of claim 16 where the point-to-point message includes information identifying the first node and the third period of time.

18. The method of claim 17 where the method further comprises:
receiving the point-to-point message at each of the one or more neighboring nodes,
transmitting the acknowledgement message to the node in response to receiving the point-to-point message,
setting a timer based on the third period of time, and
buffering packets destined for the node until the timer expires.

19. The method of claim 16 where in response to selecting a fourth sleep mode of the at least four sleep modes, the powering down the node for the sleep duration includes:
transmitting a routing application message to each of the one or more neighboring nodes, the routing application message causing each of the one or more neighboring nodes to transmit a second acknowledgment message,
setting the sleep timer to a fourth period of time in response to receiving the second acknowledgement message from each of the one or more neighboring nodes, the fourth period of time being longer than the third period of time,
buffering outgoing packets, and
powering down the at least one transceiver for the fourth period of time.

20. The method of claim 19 where the routing application message includes information identifying the node and the fourth period of time.

21. The method of claim 20 where the method further comprises:
receiving the routing application message at each of the one or more neighboring nodes,
transmitting the second acknowledgement message to the node in response to receiving the routing application message,
transmitting another message to at least one other node indicating that the node is entering the fourth sleep mode,
setting a timer based on the fourth period of time, removing the node from one or more routing tables associated with the neighboring node, and buffering packets destined for the node until the timer expires.

22. The method of claim 21 where the method further comprises:

making the node available in the one or more routing tables after the timer expires.

23. A computer-readable memory device including a plurality of instructions that, when executed by at least one processor, causes the at least one processor to perform a method for conserving power in a node of a communications network, the node including at least one transceiver, the method comprising:

monitoring one or more conditions in the communications network;

selecting one of a plurality of sleep modes based on the monitoring, each sleep mode of being associated with a different powering down procedure and a sleep duration; and powering down the at least one transceiver for the sleep duration and in accordance with the powering down procedure associated with the selected sleep mode, where the plurality of sleep modes includes at least four sleep modes, where in response to selecting a first sleep mode of the at least four sleep modes, the powering down includes:
setting a sleep timer to a first period of time,
buffering outgoing packets, and
powering down the at least one transceiver for the first period of time, and where in response to selecting a second sleep mode of the at least four sleep modes, the powering down the at least one transceiver for the sleep duration includes:
transmitting a link-level broadcast to one or more neighboring nodes,
setting the sleep timer to a second period of time, the second period of time being longer than the first period of time,
buffering outgoing packets, and
powering down the at least one transceiver for the second period of time.

24. The computer-readable memory device of claim 23 where in response to selecting a third sleep mode of the at least four sleep modes, the powering down the at least one transceiver for the sleep duration includes:

transmitting a point-to-point message to each of the one or more neighboring nodes, the point-to-point message causing each of the one or more neighboring nodes to transmit an acknowledgment message, setting the sleep timer to a third period of time in response to receiving the acknowledgement message from each of the one or more neighboring nodes, the third period of time being longer than the second period of time, buffering outgoing packets, and powering down the at least one transceiver for the third period of time.

25. The computer-readable memory device of claim 24 where in response to selecting a fourth sleep mode of the at least four sleep modes, the powering down the at least one transceiver for the sleep duration includes:

transmitting a routing application message to each of the one or more neighboring nodes, the routing application message causing each of the one or more neighboring nodes to transmit a second acknowledgment message and remove the node from at least one routing table associated with the neighboring node, setting the sleep timer to a fourth period of time in response to receiving the second acknowledgement message from each of the one or more neighboring nodes, the fourth period of time being longer than the third period of time, buffering outgoing packets, and powering down the at least one transceiver for the fourth period of time.

26. A method for conserving power in a communications node that includes at least one transceiver, comprising:

selecting a sleep mode from a group that includes at least four sleep modes, a first sleep mode of the group including powering down the at least one transceiver without notifying neighboring nodes, a second sleep mode of the group including powering down the at least one transceiver after transmitting a link-level broadcast to neighboring nodes, a third sleep mode of the group including powering down the at least one transceiver after transmitting a point-to-point message to each neighboring node and receiving a first acknowledgement message from each neighboring node, and a fourth sleep mode of the group including powering down the at least one transceiver after transmitting a routing application message to each neighboring node that causes each neighboring node to remove the communications node from its routing tables and receiving a second acknowledgement message from each neighboring node; and powering down the at least one transceiver in accordance with the selected sleep mode.

* * * * *